US010921650B2

(12) United States Patent
Ashizawa et al.

(10) Patent No.: US 10,921,650 B2
(45) Date of Patent: Feb. 16, 2021

(54) LIQUID CRYSTAL ALIGNING AGENT, LIQUID CRYSTAL ALIGNMENT FILM AND LIQUID CRYSTAL DISPLAY ELEMENT

(71) Applicant: NISSAN CHEMICAL INDUSTRIES, LTD., Chiyoda-ku (JP)

(72) Inventors: Ryoichi Ashizawa, Funabashi (JP); Masato Moriuchi, Funabashi (JP); Kanako Suzuki, Funabashi (JP); Kohei Goto, Funabashi (JP)

(73) Assignee: NISSAN CHEMICAL INDUSTRIES, LTD., Chiyoda-ku (JP)

(*) Notice: Subject to any disclaimer, the term of this patent is extended or adjusted under 35 U.S.C. 154(b) by 293 days.

(21) Appl. No.: 16/066,472

(22) PCT Filed: Dec. 27, 2016

(86) PCT No.: PCT/JP2016/088869
§ 371 (c)(1),
(2) Date: Sep. 18, 2018

(87) PCT Pub. No.: WO2017/115791
PCT Pub. Date: Jul. 6, 2017

(65) Prior Publication Data
US 2019/0018289 A1  Jan. 17, 2019

(30) Foreign Application Priority Data

Dec. 28, 2015 (JP) .................................. 2015-256573

(51) Int. Cl.
| | | |
|---|---|---|
| *G02F 1/1337* | (2006.01) | |
| *C08G 18/81* | (2006.01) | |
| *C09K 19/20* | (2006.01) | |
| *C08F 220/36* | (2006.01) | |
| *C08F 220/20* | (2006.01) | |
| *C09K 19/54* | (2006.01) | |
| *C09K 19/56* | (2006.01) | |
| *C09K 19/30* | (2006.01) | |
| *C09K 19/04* | (2006.01) | |

(52) U.S. Cl.
CPC ...... *G02F 1/133711* (2013.01); *C08F 220/20* (2013.01); *C08F 220/36* (2013.01); *C08G 18/81* (2013.01); *C08G 18/8116* (2013.01); *C08G 18/8141* (2013.01); *C09K 19/2028* (2013.01); *C09K 19/542* (2013.01); *C09K 19/56* (2013.01); *G02F 1/133788* (2013.01); C09K 2019/0448 (2013.01); C09K 2019/2035 (2013.01); C09K 2019/301 (2013.01); C09K 2019/3009 (2013.01)

(58) Field of Classification Search
CPC ......... G02F 1/133711; G02F 1/133788; G02F 220/20; G02F 220/36; C08G 18/81; C08G 18/8116; C08G 18/8141; C09K 19/2028; C09K 19/524; C09K 19/56; C09K 2019/0448; Y10T 428/10; Y10T 428/1005
USPC .......... 428/1.1, 1.2, 1.23; 264/1.7; 524/589; 526/310
See application file for complete search history.

(56) References Cited

U.S. PATENT DOCUMENTS

| | | |
|---|---|---|
| 5,276,132 A | 1/1994 | Nishikawa et al. |
| 2004/0188653 A1 | 9/2004 | Kataoka et al. |
| 2010/0085523 A1 | 4/2010 | Terashita et al. |
| 2011/0135850 A1 | 6/2011 | Saha et al. |
| 2013/0331482 A1 | 12/2013 | Tanabe et al. |
| 2016/0369025 A1* | 12/2016 | Yukawa .................. G02B 1/04 |

FOREIGN PATENT DOCUMENTS

| | | |
|---|---|---|
| JP | 3-179323 A | 8/1991 |
| JP | 4-281427 A | 10/1992 |
| JP | 2005-187618 A | 7/2005 |
| JP | 4504626 B2 | 4/2010 |
| JP | 4995267 B2 | 5/2012 |
| JP | 2013-513017 A | 4/2013 |
| JP | 10-20130073024 A | 7/2013 |
| JP | 2014-12823 A | 1/2014 |

OTHER PUBLICATIONS

International Preliminary Report on Patentability and Written Opinion dated Jul. 12, 2018 in PCT/JP2016/088869 (English Translation only), 8 pages.

* cited by examiner

*Primary Examiner* — Ruiyun Zhang
(74) *Attorney, Agent, or Firm* — Oblon, McClelland, Maier & Neustadt, L.L.P.

(57) ABSTRACT

The present invention relates to a liquid crystal aligning agent which contains a polymer that has a site having an isocyanate group and/or a blocked isocyanate group, a site having a photoreactive group having photoalignment, and a site having at least one functional group selected from an amino group and a hydroxyl group in each molecule. The present invention provides a liquid crystal display element which enables baking at low temperatures during the formation of a liquid crystal alignment film by a photoalignment method, the liquid crystal alignment film being able to be imparted with alignment regulating property and pretilt angle developing property.

19 Claims, No Drawings

LIQUID CRYSTAL ALIGNING AGENT, LIQUID CRYSTAL ALIGNMENT FILM AND LIQUID CRYSTAL DISPLAY ELEMENT

TECHNICAL FIELD

The present invention relates to a liquid crystal aligning agent including a polymer having a side chain having or developing an isocyanate group, a side chain exhibiting photoreactivity, and a side chain having a hydroxyl group or an amino group, a liquid crystal alignment film obtained by this agent, and a liquid crystal display element including a liquid crystal alignment film thus obtained.

BACKGROUND ART

In a liquid crystal display element, a liquid crystal alignment film plays a role of aligning liquid crystal in a certain direction.

At present, major liquid crystal alignment films used in the industrial field are made by applying a polyimide liquid crystal aligning agent composed of polyamic acid or polyamic acid ester, which is a polyimide precursor, or a polyimide solution to a substrate, and forming a film.

When liquid crystal is aligned in parallel or obliquely with the substrate surface, after film formation, the surface is further subjected to drawing treatment by rubbing.

On the other hand, when liquid crystal is oriented vertically to the substrate (may be referred to as vertical alignment (VA) system), used is a liquid crystal alignment film having a hydrophobic group such as a long-chain alkyl group, a cyclic group, or a combination of a cyclic group and an alkyl group (for example, see Patent Document 1), and a steroid skeleton (for example, see Patent Document 2) in the side chain of polyimide. In this case, when the liquid crystal molecules are inclined toward the direction parallel to the substrate by application of a voltage between the substrates, the liquid crystal molecules must be inclined toward one direction within the substrate surface from the normal direction of the substrate. As the methods for this, for example, proposed are a method for forming projections on the substrate, a method for forming a slit in the display electrode, a method for slightly inclining (pretilting) the liquid crystal molecules by rubbing from the normal direction of the substrate toward one direction within the substrate surface method, and a method for adding a light polymerizable compound to the liquid crystal composition in advance, using it together with a vertical alignment film such as a polyimide, and irradiating the liquid crystal cells with ultraviolet light under application of a voltage, thereby pretilting the liquid crystal (for example, see Patent Document 3).

In recent years, a method using anisotropic photochemical reaction by polarized ultraviolet irradiation or others (photoalignment method) is proposed as a replacement of the formation of projections and slits in the regulation of liquid crystal alignment of VA system, and the PSA technique. More specifically, it is known that the inclined direction of the liquid crystal molecules upon application of a voltage can be uniformly regulated by irradiating a vertically aligned polyimide film having photoreactivity with polarized ultraviolet light for imparting alignment regulating property and pretilt angle developing property (see Patent Document 4). This case also uses polyimide liquid crystal alignment films which have high durability and being suitable for the regulation of pretilt angles of liquid crystal as prior art alignment films.

On the other hand, high polarity solvents such as N-methyl-2-pyrrolidone (NMP) are used as the solvents of liquid crystal alignment processing agents including polyimide polymers because these polyimide polymers have low solvent solubility. These high polarity solvents have high boiling points; for example, the boiling point of NMP is 200° C. or higher. Therefore, when a liquid crystal alignment film is made using a liquid crystal alignment processing agent including NMP as a solvent, baking at a high temperature around 200° C., which is near the boiling point of NMP, is necessary for removing NMP remaining in the liquid crystal alignment film.

On the other hand, when a thin and lightweight plastic substrate having low heat resistance is used as the substrate of a liquid crystal display element, baking in making of a liquid crystal alignment film must be carried at lower temperatures. It is also demanded to reduce the energy cost in the production of liquid crystal display elements by decreasing the baking temperature.

PRIOR ART LIST

Patent Document

Patent Document 1: Japanese Patent Application Laid-Open Publication No. H3(1991)-179323 A
Patent Document 2: Japanese Patent Application Laid-Open Publication No. H4(1992)-281427 A
Patent Document 3: Japanese Patent Publication No. 4504626 B
Patent Document 4: Japanese Patent Publication No. 4995267 B

SUMMARY OF INVENTION

Problems to be Solved by the Invention

The present invention is intended to provide a liquid crystal display element having the above-described properties.

More specifically, the present invention is intended to provide a liquid crystal display element which enables baking at low temperatures during the formation of a liquid crystal alignment film by a photoalignment method, the liquid crystal alignment film being able to be imparted with alignment regulating property and pretilt angle developing property.

Additionally, the present invention is also intended to provide a liquid crystal display element which has high stability of the pretilt angles of liquid crystal, and rarely causes display burn-in even after long-term use.

Additionally, the present invention is also intended to provide a vertical liquid crystal alignment film used in the liquid crystal display element, and a liquid crystal aligning agent which can provide the vertical liquid crystal alignment film.

Means for Solving Problems

The inventors found the present invention having the following abstract <1>.

<1> A liquid crystal aligning agent including a polymer having: (a) a site having an isocyanate group and/or a blocked isocyanate group; (b) a site having at least one functional group selected from an amino group and a hydroxyl group within each molecule; and (c) a site having a photoreactive group having photoalignment.

Effects of the Invention

According to the present invention, there can be provided a liquid crystal aligning agent which enables baking at low temperatures during the formation of a liquid crystal alignment film by a photoalignment method, the liquid crystal alignment film being able to be imparted with alignment regulating property and pretilt angle developing property.

Additionally, a liquid crystal display element manufactured by the method of the present invention has high stability of the pretilt angles of the liquid crystal, and its display properties will not be impaired even if continuously driven for a long time.

EMBODIMENTS FOR CARRYING OUT THE INVENTION

As described above, the liquid crystal aligning agent of the present invention includes a polymer (hereinafter may be referred to as "specific polymer") having a site (a) having an isocyanate group and/or a blocked isocyanate group, a site (b) having at least one functional group selected from an amino group and a hydroxyl group in each molecule, and a site (c) having a photoreactive group having photoalignment. The above-described three "sites" can be side chains in the polymer, so that they can be called "side chains" as necessary.

The components of the present invention are described below in detail.

<Component (A): Specific Polymer>

The above-described specific polymer can be conceptually represented by the following formula (I).

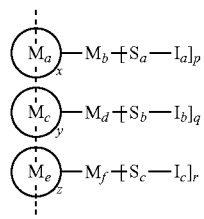  (I)

wherein

Sa, Sb, and Sc each represent an independent spacer unit, the bonding pointers left of Sa, Sb, and Sc respectively mean that they connect to the backbone of the specific polymer optionally via a spacer, and are divalent organic groups, Ia represents an isocyanate group or a blocked isocyanate group, Ib represents a monovalent organic group having a photoreactive group having photoalignment, and Ic represents a monovalent organic group having at least one functional group selected from an amino group and a hydroxyl group.

Definitions of Ma, Mb, Mc, Md, Me, and Mf are the same as those given in the below-described formulae (1m), (3m), and (4m).

Although x, y, and z are not particularly limited, for example, x, y, and z may each independently 0.1 or more and 0.8 or less.

The formula (I) means that the side chains are present at the ratio of x, y, and z, and does not means a blocked copolymer wherein these side chains are blocked in the polymer.

The specific polymer included in the liquid crystal aligning agent of the present invention causes crosslinking reaction or isomerization upon photosensitization. The structure of the site having photoalignment is not particularly limited, but preferably has a cinnamic acid structure. Additionally, it has high sensitivity to light, so that it can develop alignment regulating property even under polarized ultraviolet irradiation at a low exposure dose. Furthermore, the specific polymer causes crosslinking reaction between the polymers and cures by reaction between an isocyanate group and an amino group or a hydroxyl group. In this case, the vertical alignment regulating property thus achieved is maintained stable for a long period, even under external stress such as heat.

<<(a) Site Having an Isocyanate Group and/or a Blocked Isocyanate Group>>

In the present invention, the specific polymer included in the liquid crystal aligning agent is characterized in that it has a site having an isocyanate group and/or a blocked isocyanate group. In other words, the specific polymer is characterized in that it has an isocyanate group and/or a blocked isocyanate group in its side chain.

The site having an isocyanate group and/or a blocked isocyanate group is preferably the following formula (1).

The site is preferably derived from the monomer represented by the following formula (1m).

  (1)

  (1m)

In the formula (1) or the formula (1m), Sa represents a spacer unit, the bonding pointer left of Sa represents bonding to the backbone of the specific polymer optionally via a spacer, and Ia represents an isocyanate group or a blocked isocyanate group.

Additionally, in the formula (1m), Ma represents a first polymerizable group. Examples of the first polymerizable group include radical polymerizable groups of (meth)acrylate, fumarate, maleate, α-methylene-γ-butyrolactone, styrene, vinyl, maleimide, norbornene, (meth)acrylamide, and derivatives thereof, and siloxane. Preferable ones are (meth)acrylate, α-methylene-γ-butyrolactone, styrene, vinyl, maleimide, and acrylamide.

In the formula (1m), p is an integer of 1 to 3, preferably 1 or 2.

In the formula (1m), Mb is a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic group, a divalent alicyclic group, a trivalent alicyclic group, a tetravalent alicyclic group, a divalent condensed cyclic group, a trivalent condensed cyclic group, or a tetravalent condensed cyclic group, these groups may be unsubstituted, or one or more hydrogen atoms may be substituted with a fluorine atom, a chlorine atom, a cyano group, a methyl group, or a methoxy group.

In the formula (1) or the formula (1m), Sa is preferably derived from the following formula (2).

  (2)

In the formula (2),
the bond left of $W_1$ represents a bond to Mb,
the bond right of $W_3$ represents a bond to Ia,
$W_1$, $W_2$, and $W_3$ each independently represent a single bond, a divalent heterocycle, —(CH$_2$)$_n$— (wherein n represents 1 to 20), —OCH$_2$—, —CH$_2$O—, —COO—, —OCO—, —CH═CH—, —CF═CF—, —CF$_2$O—, —OCF$_2$—, —CF$_2$CF$_2$—, or —C≡C—, wherein in these substituents, one or more non-adjacent CH$_2$ groups may be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —OCO—NR—, —NR—CO—NR—, —CH═CH—, —C≡C—, or —O—CO—O— (wherein, R independently represents hydrogen or a linear or branched alkyl group having a carbon atom number of 1 to 5),
$A_1$ and $A_2$ each independently a divalent aromatic group, a divalent alicyclic group, a divalent heterocyclic group, or a divalent condensed cyclic group, these groups may be unsubstituted, or one or more hydrogen atoms may be substituted with a fluorine atom, a chlorine atom, a cyano group, a methyl group, or a methoxy group.

In the Ia in the formula (1) or the formula (1m), the "blocked isocyanate group" is an isocyanate group whose isocyanate group (—NCO) is blocked by an appropriate protective group (BL), which can be represented by, for example, the following formula (II).

In the present invention, in the blocked isocyanate group, the protective group (blocked site) is detached by thermal dissociation during formation of a liquid crystal alignment film under heating and firing, whereby a reactive isocyanate group is formed. The isocyanate group thus formed causes crosslinking reaction with other side chain of a polymer composing the liquid crystal alignment film. Additionally, the isocyanate group reacts with a compound having two or more of one or more types of functional group selected from the group consisting of an amino group and a hydroxyl group.

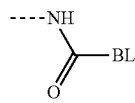

(II)

wherein BL represents a protective group of isocyanate.

In the present invention, the site having a blocked isocyanate group is not particularly limited as to its type and structure. The blocked isocyanate group can be obtained by, for example, allowing an appropriate blocking agent to act on the compound having an isocyanate group in each molecule.

Examples of the blocking agent include alcohols such as methanol, ethanol, isopropanol, n-butanol, 1-methoxy-2-propanol, 2-ethoxyhexanol, 2-N,N-dimethylaminoethanol, 2-ethoxyethanol, and cyclohexanol; phenols such as phenol, o-nitrophenol, p-chlorophenol, o-, m-, or p-cresol; lactams such as ε-caprolactam; oximes such as acetone oxime, methyl ethyl ketone oxime, methyl isobutyl ketone oxime, cyclohexanone oxime, acetophenone oxime, and benzophenone oxime; pyrazoles such as pyrazole, 3,5-dimethylpyrazole, and 3-methylpyrazole; thiols such as dodecanethiol and benzenethiol; and carboxylates such as diethyl malonate. Preferred ones are ethanol, isopropanol, 1-methoxy-2-propanol, 3,5-dimethylpyrazole, γ-caprolactam, and methyl ethyl ketone oxime.

Preferred examples of the specific structure of BL include, but not limited to, the following BL-1 to BL-7. The bonding pointer expressed by a broken line represents the coupling part with the carbon of the formula (I).

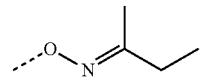
BL-1

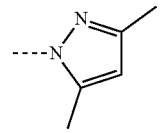
BL-2

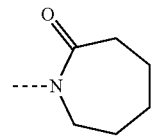
BL-3

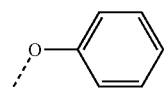
BL-4

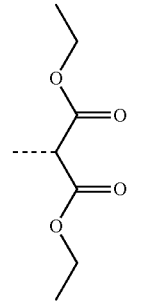
BL-5

BL-6

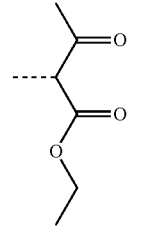
BL-7

Examples of Ia include, but not limited to, the following Ia-1 to Ia-8. In the formulae, the broken line represent bonding to Sa in the formula (1), $R_6$ represents a linear or branched alkyl group having a carbon number of 1 to 10 (wherein one or more non-adjacent CH$_2$ groups may be independently substituted with an oxygen atom).

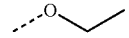
Ia-1

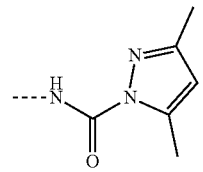
Ia-2

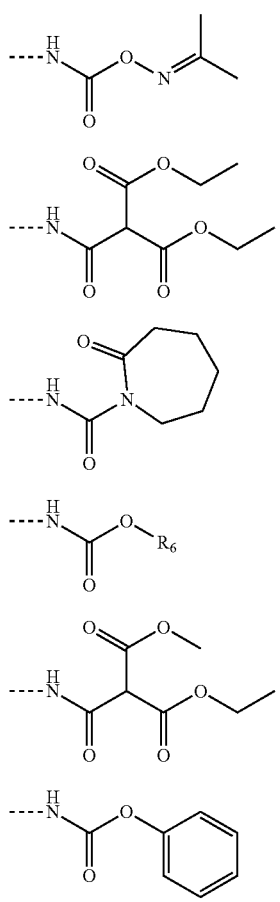

As will be described later, in the case of further using a crosslinking compound, when an unblocked isocyanate group is contained as a component of the specific polymer, the isocyanate group exhibits marked reactivity to a compound having two or more of one or more types of functional group selected from a group consisting of an amino group and a hydroxyl group in each molecule, so that it allows efficient crosslinking reaction even in baking at low temperatures.

The reaction temperature between an isocyanate group and an amino group or a hydroxyl group is preferably 50° C. to 200° C., more preferably 80° C. to 200° C., and even more preferably 80° C. to 180° C.

The isocyanate group has good reactivity to an amino group or a hydroxyl group, particularly an amino group; its crosslinking reaction may proceed even at low temperatures, and storage stability of the liquid crystal aligning agent may deteriorate. Therefore, when the liquid crystal aligning agent is stored for a long period, a blocked isocyanate group may be used.

At high temperatures such as the temperature of heating baking during formation of a liquid crystal alignment film, some kind of the blocked isocyanate site may cause crosslinking reaction through the isocyanate group because of thermal dissociation of the blocked site. The isocyanate group preferably will not cause crosslinking at low temperatures for storing the liquid crystal aligning agent (for example, −20° C. to 40° C.). In order to achieve such thermal reactivity, the side chain having a blocked isocyanate group preferably has a considerably higher heat dissociative temperature in the blocked site than the storage temperature of the liquid crystal aligning agent, for example, 50° C. to 230° C., and more preferably 60° C. to 150° C.

In the present invention, the site having an isocyanate group and/or a blocked isocyanate group is preferably, as described above, derived from the monomer represented by the above-described formula (1m). Examples of the monomer represented by the formula (1m) include, but not limited to, the followings.

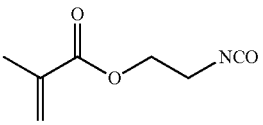

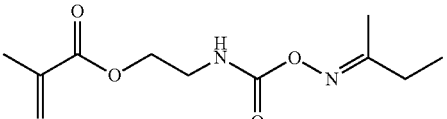

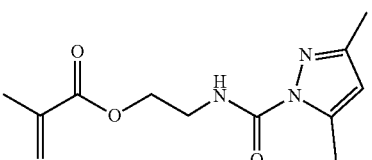

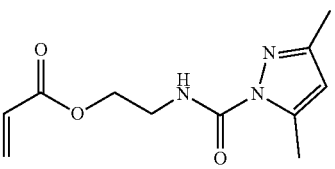

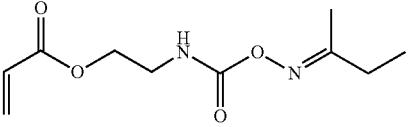

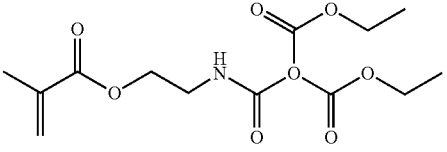

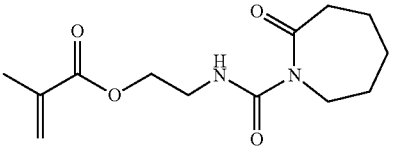

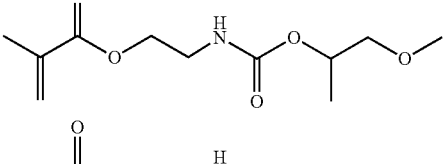

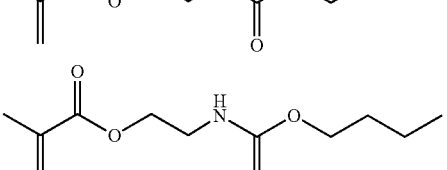

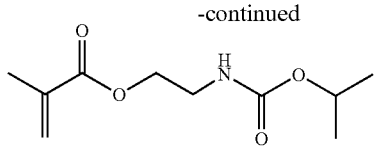

The polymer having a blocked isocyanate group in its side chain included in the liquid crystal aligning agent of the present invention can be obtained by producing a polymer using a raw material of various polymers containing a blocked isocyanate group. For example, when a (meth)acryl polymer is used as a polymer, the polymer can be obtained by polymerizing a (meth)acryl polymer using a compound having an isocyanate group blocked with a monomer having a (meth)acryl group which is a raw material of the polymer.

The site having an isocyanate group and/or a blocked isocyanate group to be contained in the polymer of the present invention may be used alone, or in combination of two or more sites.

The introduction amount of the site having an isocyanate group and/or a blocked isocyanate group is preferably 5 to 90 mol %, more preferably 10 to 90 mol %, and even more preferably 20 to 80 mol % of the specific polymer (component (A)).

<<(b) Side Chain Having a Photoreactive Group Having Photoalignment>>

The specific polymer contained in the liquid crystal aligning agent of the present invention has a site having a photoreactive group having photoalignment (hereinafter may be referred to as a photoreactive side chain).

The structure of the site having photoalignment is not particularly limited, but preferably has a cinnamic acid structure. In this case, the vertical alignment regulating property thus achieved is maintained stable for a long period, even under external stress such as heat. Additionally, it has high sensitivity to light, so that it can develop alignment regulating property even under polarized ultraviolet irradiation at a low exposure dose.

In the present invention, the site having a photoreactive group having photoalignment is preferably represented by the following formula (3).

Additionally, the site is preferably derived from the monomer represented by the following formula (3m).

In the formula (3) or (3m), Ib is a monovalent organic group having a photoreactive group having photoalignment.

Sb represents a spacer unit, the bonding pointer left of Sb represents bonding to the backbone of the polymer optionally via a spacer.

Sb is preferably a linear or branched alkylene group having a carbon number of 1 to 10, a divalent aromatic group, or a divalent alicyclic group.

Additionally, in the formula (3m), Mc represents a second polymerizable group. Examples of the second polymerizable group include, as the above-described first polymerizable group, radical polymerizable groups of (meth)acrylate, fumarate, maleate, α-methylene-γ-butyrolactone, styrene, vinyl, maleimide, norbornene, (meth)acrylamide, and derivatives thereof, and siloxane. Preferred examples are (meth)acrylate, α-methylene-γ-butyrolactone, styrene, vinyl, maleimide, and acrylamide.

The q is an integer of 1 to 3, and preferably 1 or 2.

In the formula (3m), Md is a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group, each group may be unsubstituted or substituted with a fluorine atom, a chlorine atom, a cyano group, a methyl group, or a methoxy group at one or more hydrogen atoms.

Sb is preferably represented by the formula (2), independent from the above-described Sa. When Sb represents the formula (2), wherein, same definitions of the groups in the formula (2) which can be represented by Sa in the formula (1) are applied, except that bonding left of $W_1$ represents bonding to Md.

In the present invention, the photoreactive group having photoalignment means a group which causes photoisomerization or photodimerization by stimulation with ultraviolet, and preferably has, for example, the group represented by any of the following formulae (III)-1 to (III)-4, but not limited to them.

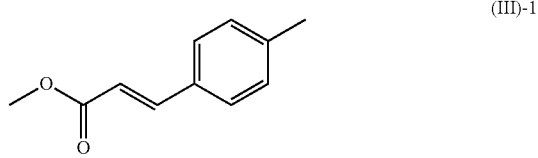

(III)-1

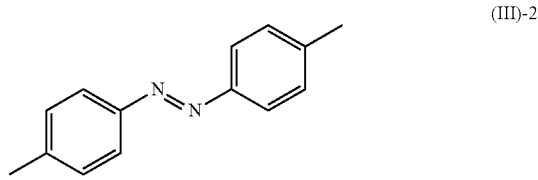

(III)-2

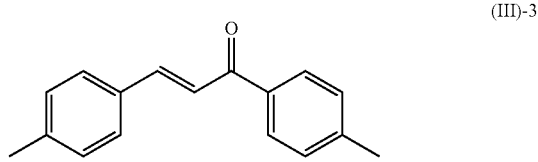

(III)-3

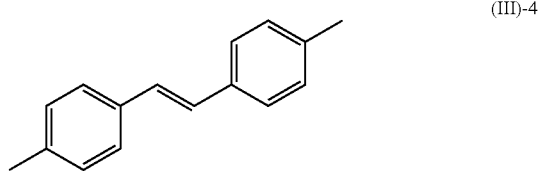

(III)-4

Accordingly, the "monovalent organic group having a photoreactive group having photoalignment" which can be represented by the Ib means a monovalent organic group having any of the groups of the formulae (III)-1 to (III)-4. The "monovalent organic group" means an organic group which include any of the structures of the formulae (III)-1 to (III)-4 in its structure, and can bind to Sb.

Preferred examples of the site having photoalignment, which can develop good vertical alignment regulating property and stable pretilt angle, include, but not limited to, the structure of the formula (3m)-1 having the group represented by the (III)-1.

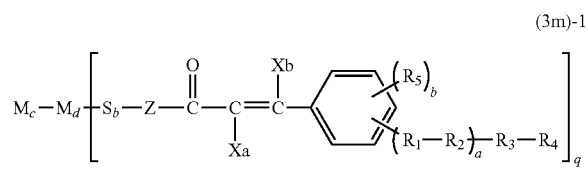

(3m)-1

In the formula (3m)-1, definitions of Mc, Md, Sb, and q are same as above-described ones.

Additionally, Z is an oxygen atom or a sulfur atom.

Xa and Xb are each independently a hydrogen atom, a fluorine atom, a chlorine atom, a cyano group, or an alkyl group having a carbon number of 1 to 3.

$R_1$ is a single bond, an oxygen atom, —COO— or —OCO—, preferably a single bond, —COO— or —OCO—.

$R_2$ is a divalent aromatic group, a divalent alicyclic group, a divalent heterocyclic group, or a divalent condensed cyclic group.

$R_3$ is a single bond, an oxygen atom, —COO— or —OCO—.

$R_4$ is a monovalent organic group having a carbon number of 3 to 40 containing a linear or branched alkyl group or alicyclic group having a carbon number of 1 to 40.

$R_5$ is an alkyl group having a carbon number of 1 to 3, an alkoxy group having a carbon number of 1 to 3, a fluorine atom or a cyano group, and preferably a methyl group, a methoxy group, or a fluorine atom.

The symbol a is an integer of 0 to 3, and b is an integer of 0 to 4.

The linear or branched alkylene group having a carbon number of 1 to 10 of Sb is preferably a linear or branched alkylene group having a carbon number of 1 to 8, and preferred examples include a methylene group, an ethylene group, an n-propylene group, an n-butylene group, a t-butylene group, an n-pentylene group, an n-hexylene group, an n-heptylene group, and an n-octylene group.

Examples of the divalent aromatic group of Sb include a 1,4-phenylene group, a 2-fluoro-1,4-phenylene group, a 3-fluoro-1,4-phenylene group, and a 2,3,5,6-tetrafluoro-1,4-phenylene group. Examples of the divalent alicyclic group of Sb include trans-1,4-cyclohexylene, and trans-trans-1,4-bicyclohexylene.

Examples of the divalent heterocyclic group of Sb include a 1,4-pyridylene group, a 2,5-pyridylene group, a 1,4-furanylene group, a 1,4-piperazine group, and a 1,4-piperidine group.

Examples of the divalent condensed cyclic group of Sb include a naphthylene group.

Sb is preferably an alkylene group having a carbon number of 1 to 8, more preferably an alkylene group having a carbon number of 1 to 6, even more preferably analkylene group having a carbon number of 1 to 4.

Examples of the divalent aromatic group of $R_2$ include a 1,4-phenylene group, a 2-fluoro-1,4-phenylene group, a 3-fluoro-1,4-phenylene group, and a 2,3,5,6-tetrafluoro-1,4-phenylene group.

Examples of the divalent alicyclic group of $R_2$ include trans-1,4-cyclohexylene and trans-trans-1,4-bicyclohexylene.

Examples of the divalent heterocyclic group of $R_2$ include a 1,4-pyridylene group, a 2,5-pyridylene group, a 1,4-furanylene group, a 1,4-piperazine group, and a 1,4-piperidine group.

Examples of the divalent condensed cyclic group of $R_2$ include a naphthylene group.

$R_2$ is preferably a 1,4-phenylene group, trans-1,4-cyclohexylene, or trans-trans-1,4-bicyclohexylene.

Preferred examples of the linear or branched alkyl group of $R_4$ having a carbon number of 1 to 40 include a linear or branched alkyl group having a carbon number of 1 to 20, wherein some or all of the hydrogen atoms of the alkyl group may be substituted with fluorine atoms. Examples of the alkyl group include a methyl group, an ethyl group, an n-propyl gr, n-butyl group, a t-butyl group, an n-pentyl group, an n-hexyl group, an n-heptyl group, an n-octyl group, an n-nonyl group, an n-decyl group, an n-lauryl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-eicosyl group, a 4,4,4-trifluorobutyl group, a 4,4,5,5,5-pentafluoropentyl group, a 4,4,5,5,6,6,6-heptafluorohexyl group, a 3,3,4,4,5,5,5-heptafluoropentyl group, a 2,2,2-trifluoroethyl group, a 2,2,3,3,3-pentafluoropropyl group, a 2-(perfluorobutyl ethyl group, a 2-(perfluorooctyl) ethyl group, and a 2-(perfluorodecyl)ethyl group.

Examples of the monovalent organic group of $R_4$ including an alicyclic group and having a carbon number of 3 to 40 include a cholesteryl group, a cholestanyl group, an adamantyl group, and the groups represented by the following formula (A-1) or (A-2) (wherein $R_7$ is respectively a hydrogen atom, a fluorine atom, or an alkyl group having a carbon number of 1 to 20 which may be substituted with a fluorine atom).

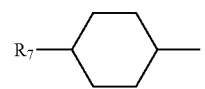

(A-1)

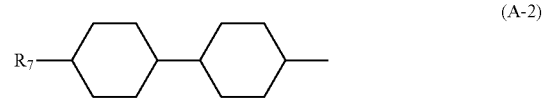

(A-2)

The site having photoalignment is preferably, as described above, derived from the monomer represented by the formula (3m) or (3m)-1. Examples of the monomer represented by the formula (3m) or (3m)-1 include, but not limited to, the followings.

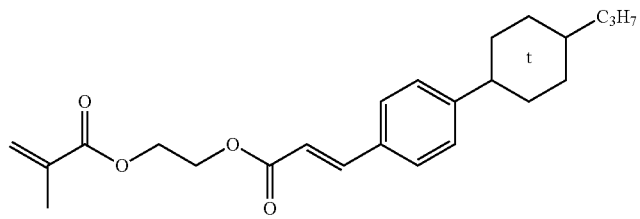

-continued
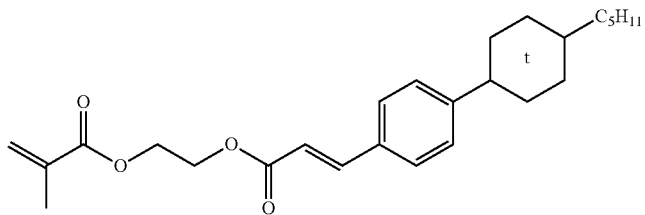
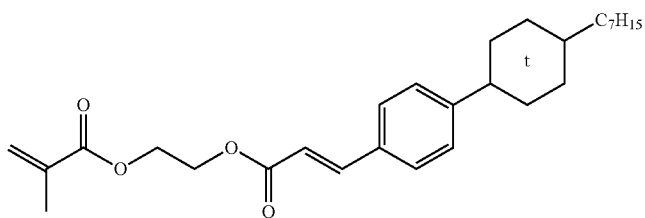
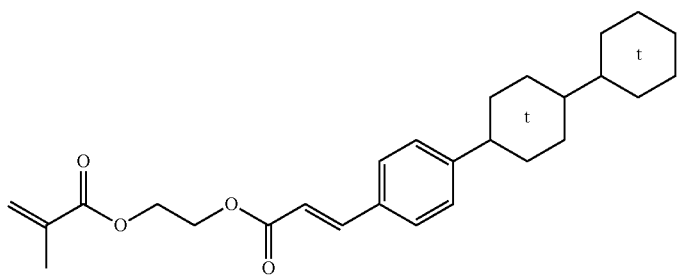
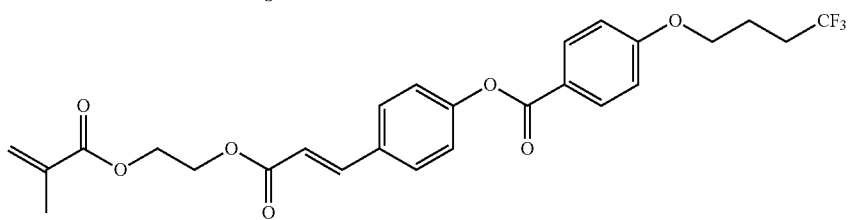
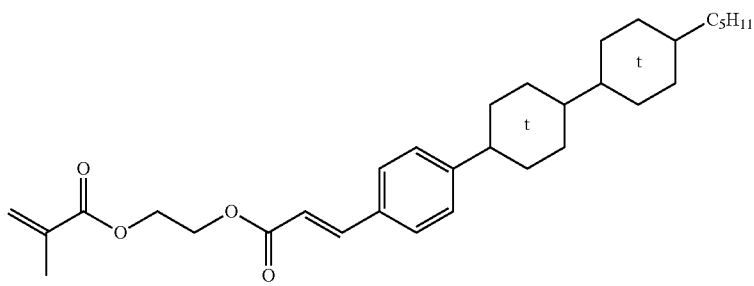
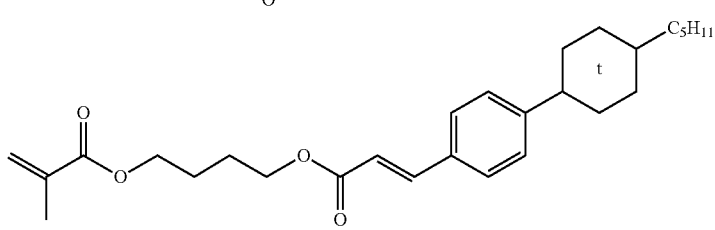
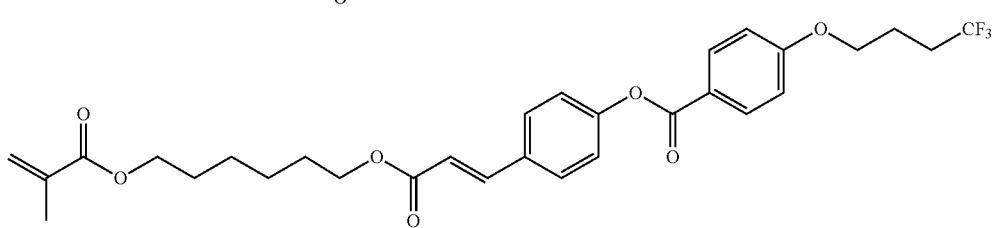

-continued
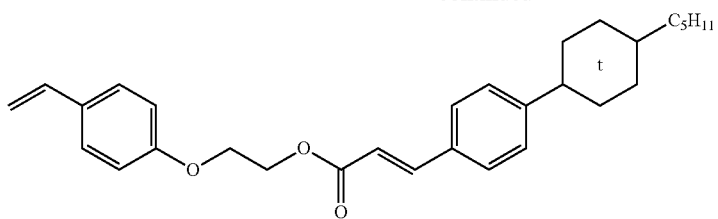
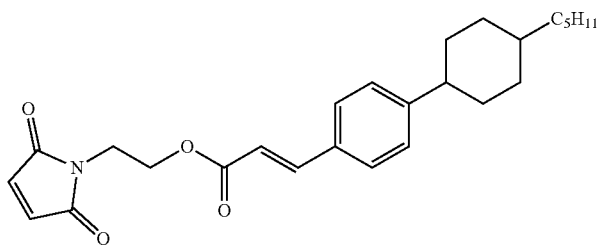
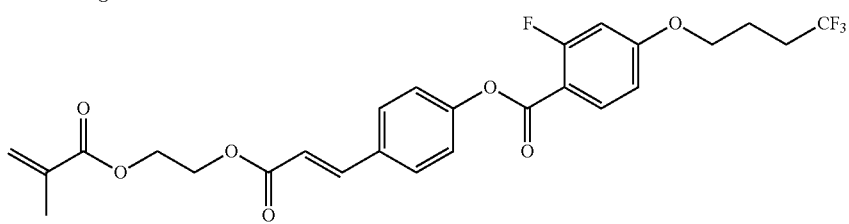
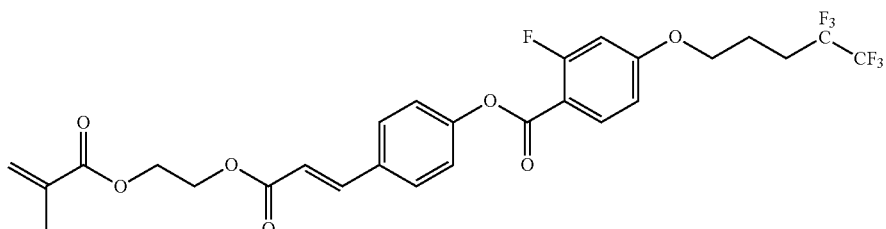
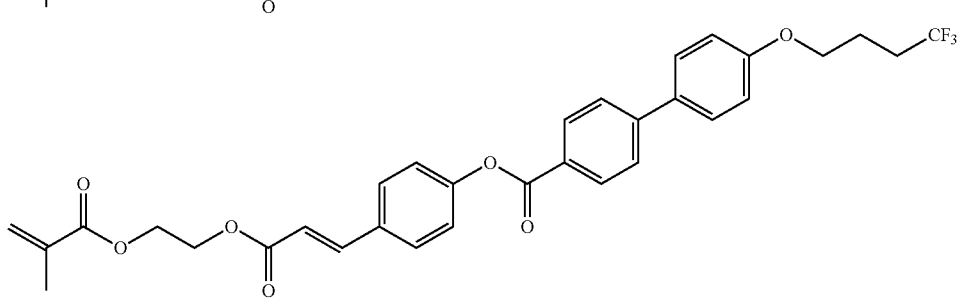
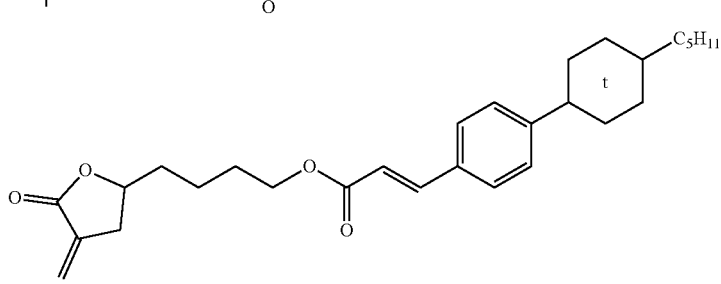
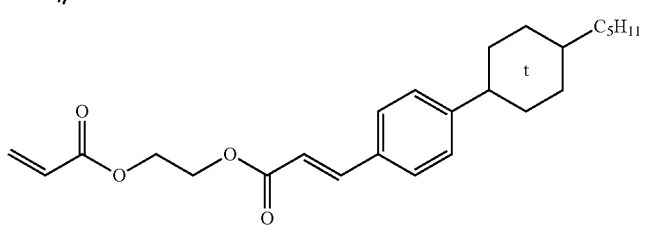

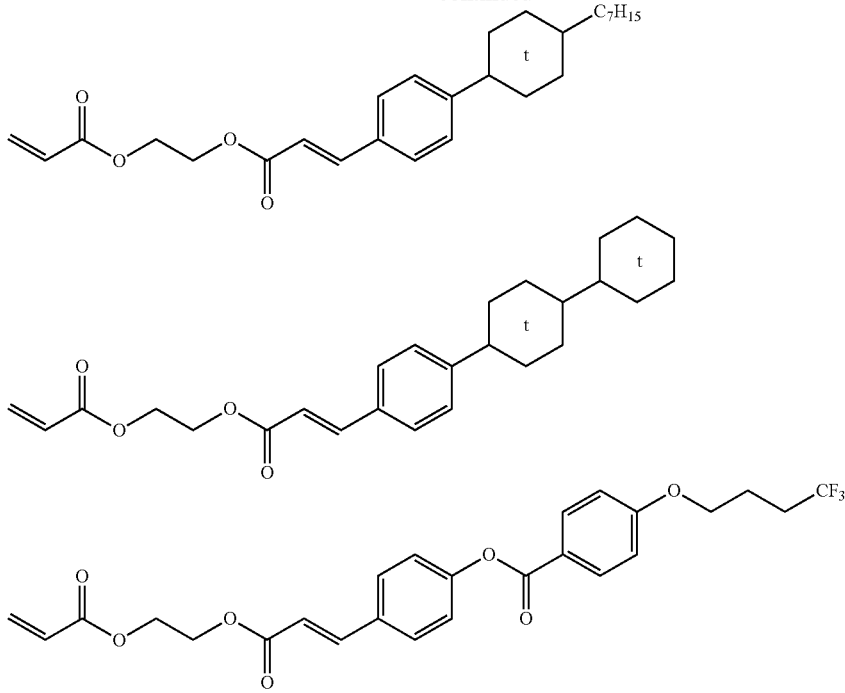

The photoreactive site contained in the polymer of the present invention may be used alone or in combination of two or more sites.

Additionally, the photoreactive site is contained at a proportion of at least 10% to 80%, preferably 20% to 60% in one type of polymer.

When the content of the photoreactive side chain is below the lower limit of the above-described range, the liquid crystal alignment film to be formed may have insufficient liquid crystal alignment.

If the introduction amount of the site having photoalignment is too small, sufficient pretilt angles may not be obtained, while if the introduction amount is too much, the introduction amount of the site having an isocyanate group and/or a blocked isocyanate group decreases, so that crosslinking reaction with the site having at least one functional group selected from the group consisting of an amino group and a hydroxyl group in each molecule, and with the crosslinking compound which is additionally added will not sufficiently progress, and sufficient pretilt angles may not be obtained.

<<(c) Site Having at Least One Functional Group Selected from an Amino Group and a Hydroxyl Group in each Molecule>>

The specific polymer contained in the liquid crystal aligning agent of the present invention has a site having at least one functional group selected from an amino group and a hydroxyl group in each molecule, more specifically, at least one functional group selected from an amino group and a hydroxyl group in each molecule in its side chain.

This site can cause crosslinking reaction with the isocyanate group of the specific polymer of the present invention or the isocyanate group formed by dissociation of the blocked site.

In the present invention, the site having at least one functional group selected from an amino group and a hydroxyl group within each molecule is preferably represented by the formula (4).

Additionally, the site is preferably derived from the monomer of the formula (4m).

$$-S_c-I_c \quad (4)$$

$$M_e-M_f\text{$\vphantom{.}$}[-S_c-I_c]_r \quad (4m)$$

In the formula (4) or (4m), Ic is a monovalent organic group having at least one functional group selected from an amino group and a hydroxyl group in each molecule.

Sc represents a spacer unit, and the bonding pointer left of Sc represents bonding to the backbone of the specific polymer optionally via a spacer.

Sc is preferably a linear or branched alkylene group, divalent aromatic group, or divalent alicyclic group having a carbon number of 1 to 10.

Additionally, in the formula (4m), Me represents a third polymerizable group. Examples of the third polymerizable group include, as is the case with the above-described first polymerizable group, radical polymerizable groups of (meth)acrylate, fumarate, maleate, α-methylene-γ-butyrolactone, styrene, vinyl, maleimide, norbornene, (meth)acrylamide, and derivatives thereof, and siloxane. Preferred ones are (meth)acrylate, α-methylene-γ-butyrolactone, styrene, vinyl, maleimide, and acrylamide.

The r is an integer of 1 to 3, preferably 1 or 2.

In the formula (4m), Mf is a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, tetravalent alicyclic group, divalent condensed cyclic group, a trivalent condensed cyclic group, or a tetravalent condensed cyclic group, wherein each group may be unsubstituted or substituted with a fluorine atom, a chlorine atom, a cyano group, a methyl group, or a methoxy group at one or more hydrogen atoms.

Sc is preferably represented by the formula (2), independent from the above-described Sa. When Sc represents the formula (2), wherein, same definitions of the groups in the formula (2) which can be represented by Sa in the formula (a) are applied, except that bonding left of $W_1$ represents bonding to Mf.

The polymer having at least one functional group selected from an amino group and a hydroxyl group in each molecule contained in the liquid crystal aligning agent of the present invention can be obtained by producing a polymer using a raw material of various polymers containing an amino group and a hydroxyl group. For example, when a (meth)acryl polymer is used as a polymer, the polymer can be obtained by polymerizing a (meth)acryl polymer using a compound having an isocyanate group blocked with a monomer having a (meth)acryl group which is a raw material of the polymer.

In the present invention, the site having at least one functional group selected from an amino group and a hydroxyl group within each molecule is, as described above, preferably derived from the monomer represented by the formula (4m). Preferred examples of the monomer represented by the formula (4m) include, but not limited to, the followings.

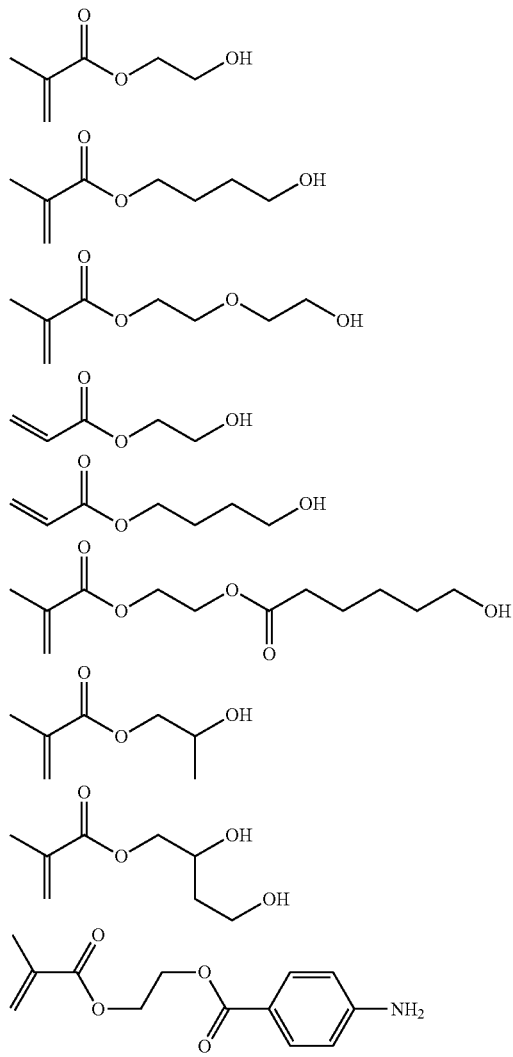

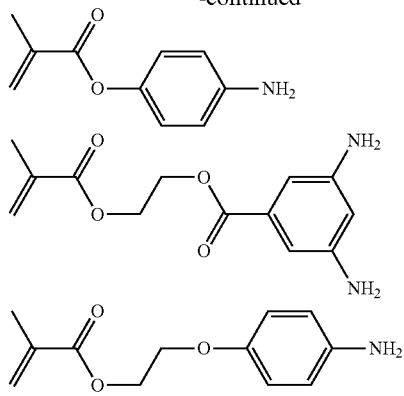

The site having at least one functional group selected from an amino group and a hydroxyl group within each molecule to be contained in the polymer of the present invention may be used alone, or in combination of two or more sites.

Additionally, the site having at least one functional group selected from an amino group and a hydroxyl group within each molecule is contained in at least one polymer in the proportion of 10% to 80%, preferably 20% to 60%.

<Method for Producing Specific Polymer>

The specific polymer contained in the liquid crystal aligning agent of the present invention is obtained by polymerizing the site (a) having an isocyanate group and/or a blocked isocyanate group, the monomer (b) having a photoreactive group having photoalignment, and the monomer (c) having at least one functional group selected from an amino group and a hydroxyl group in molecule. Additionally, it may be copolymerized with other monomer within the range which will not impair alignment and other properties. Examples of the other monomer include industrially available radical polymerizable monomers.

Specific examples of the other monomer include unsaturated carboxylic acid, an acrylic acid ester compound, a methacrylic acid ester compound, a maleimide compound, acrylonitrile, maleic anhydride, a styrene compound, and a vinyl compound.

Specific examples of unsaturated carboxylic acid include acrylic acid, methacrylic acid, itaconic acid, maleic acid, and fumaric acid.

Examples of the acrylate compound include methylacrylate, ethyl acrylate, isopropyl acrylate, benzyl acrylate, naphthyl acrylate, anthryl acrylate, anthryl methylacrylate, phenylacrylate, 2,2,2-trifluoroethyl acrylate, tert-butyl acrylate, cyclohexyl acrylate, isobornyl acrylate, 2-methoxyethyl acrylate, methoxy triethylene glycol acrylate, 2-ethoxyethyl acrylate, tetrahydrofurfuryl acrylate, 3-methoxy butyl acrylate, 2-methyl-2-adamantyl acrylate, 2-propyl-2-adamantyl acrylate, 8-methyl-8-tricyclodecyl acrylate, and, 8-ethyl-8-tricyclodecyl acrylate.

Examples of the methacrylate compound include methyl methacrylate, ethyl methacrylate, isopropyl methacrylate, benzyl methacrylate, naphthyl methacrylate, anthryl methacrylate, anthryl methyl methacrylate, phenylmethacrylate, 2,2,2-trifluoroethyl methacrylate, tert-butyl methacrylate, cyclohexyl methacrylate, isobornyl methacrylate, 2-methoxyethyl methacrylate, methoxy triethylene glycol methacrylate, 2-ethoxyethyl methacrylate, tetrahydrofurfuryl methacrylate, 3-methoxy butyl methacrylate, 2-methyl- 2-adamantyl methacrylate, 2-propyl-2-adamantyl methacrylate, 8-methyl-8-tricyclodecyl methacrylate, and, 8-ethyl-8-tricyclodecyl methacrylate.

Other examples include (meth)acrylate compounds having a cyclic ether group, such as glycidyl (meth)acrylate, (3-methyl-3-oxetanyl) methyl(meth)acrylate, and (3-ethyl-3-oxetanyl)methyl (meth)acrylate.

Examples of the vinyl compound include Vinyl ether, methyl vinyl ether, benzyl vinyl ether, 2-hydroxyethyl vinyl ether, phenyl vinyl ether, and propyl vinyl ether.

Examples of the styrene compound include styrene, methylstyrene, chlorostyrene, and bromostyrene.

Examples of the maleimide compound include maleimide, N-methyl maleimide, N-phenyl maleimide, and N-cyclohexyl maleimide.

In the present invention, the method for producing the specific polymer is not particularly limited, and may use an ordinary method used in the industrial field. Specifically, it can be produced by cationic polymerization, radical polymerization, or anionic polymerization using the vinyl group of a photoaligning monomer or a monomer having an isocyanate group and/or blocked isocyanate group. Among them, radical polymerization is particularly preferred, from the viewpoint of easiness of reaction control.

The polymerization initiator of radical polymerization may be a known compound such as a radical polymerization initiator, or a reversible addition-fragmentation chain transfer (RAFT) polymerization reagent.

The radical heat polymerization initiator is a compound which generates radicals when heated to its decomposition temperature or higher. Examples of the radical heat polymerization initiator include ketone peroxides (for example, methyl ethyl ketone peroxide and cyclohexanone peroxide), diacyl peroxides (for example, acetyl peroxide and benzoyl peroxide), hydroperoxides (for example, hydrogen peroxide, tert-butyl hydroperoxide, and cumene hydroperoxide), dialkyl peroxides (for example, di-tert-butyl peroxide, dicumyl peroxide, and dilauroyl peroxide), peroxyketals (for example, dibutyl peroxycyclohexane), alkyl peresters (peroxyneodecanoic acid-tert-butyl ester, peroxypivalic acid-tert-butyl ester, and peroxy 2-ethyl cyclohexane acid-tert-amyl ester), persulfates (for example, potassium persulfate, sodium persulfate, and ammonium persulfate), and azo compounds (for example, azobisisobutyronitrile and 2,2'-di(2-hydroxyethyl) azobisisobutyronitrile). These radical heat polymerization initiators may be used alone, or in combination of two or more of them.

The radical photopolymerization initiator is not particularly limited as long as it is a compound which initiates radical polymerization upon photoirradiation. Examples of the radical photopolymerization initiator include benzophenone, Michler's ketone, 4,4'-bis(diethylamino)benzophenone, xanthone, thioxanthone, isopropyl xanthone, 2,4-diethylthioxanthone, 2-ethylanthraquinone, acetophenone, 2-hydroxy-2-methylpropiophenone, 2-hydroxy-2-methyl-4'-isopropyl propiophenone, 1-hydroxycyclohexylphenylketone, isopropyl benzoin ether, isobutyl benzoin ether, 2,2-diethoxy acetophenone, 2,2-dimethoxy-2-phenylacetophenone, camphor quinone, benzanthrone, 2-methyl-1-[4-(methylthio)phenyl]-2-morpholinopropane-1-one, 2-benzyl-2-dimethylamino-1-(4-morpholinophenyl)-butanone-1,4-dime thylaminobenzoate ethyl, 4-isoamyl dimethylaminobenzoate, 4,4'-di(t-butyl peroxycarbonyl) benzophenone, 3,4,4'-tri(t-butyl peroxycarbonyl) benzophenone, 2,4,6-trimethylbenzoyl diphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di (trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl) benzthiazole, 2-mercaptobenzothiazole, 3,3'-carbonyl bis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2T-bis(2,4-dichlorophenyl)-4,4',5,5'-tetraphenyl-1,2'-biimidazole, 2,2'bis(2,4-dibromophenyl)-4,4',5,5'-tetraphenyl-1,2'-biimidazole, 2,2T-bis(2,4,6-trichlorophenyl)-4,4',5,5'-tetraphenyl-1,2'-biimidazole, 3-(2-methyl-2-dimethylaminopropionyl) carbazole, 3,6-bis(2-methyl-2-morpholinopropionyl)-9-n-dodecyl carbazole, 1-hydroxycyclohexyl phenylketone, bis(5-2,4-cyclopentadiene-1-yl)-bis(2,6-difluoro-3-(1H-pyrrole-1-yl-phenyl) titanium, 3,3',4,4'-tetra(t-butyl peroxycarbonyl) benzophenone, 3,3',4,4'-tetra(t-hexylperoxycarbonyl) benzophenone, 3,3'-di(methoxycarbonyl)-4,4'-di(t-butyl peroxy carbonyl)benzophenone, 3,4'-di (methoxycarbonyl)-4,3'-di(t-butylperoxycarbonyl) benzophenone, 4,4'-di(methoxycarbonyl)-3,3'-di(t-butylperoxycarbonyl) benzophenone, 2-(3-methyl-3H-benzothiazole-2-ylidene)-1-naphthalene-2-yl-ethanone, and 2-(3-methyl-1,3-benzothiazole-2(3H)-ylidene)-1-(2-benzoyl) ethanone. These compounds may be used alone, or in combination of two or more of them.

The radical polymerization method is not particularly limited, and may use, for example, an emulsion polymerization method, a suspension polymerization method, a dispersion polymerization method, a precipitation polymerization method, a bulk polymerization method, or a solution polymerization method.

The organic solvent used for polymerization reaction of the polymer having a site having an isocyanate group and/or a blocked isocyanate group and a site having photoalignment is not particularly limited as long as it dissolves the polymer to be formed. Specific examples are given below.

N,N-dimethylformamide, N,N-dimethylacetamide, N-methyl-2-pyrrolidone, N-ethyl-2-pyrrolidone, N-methylcaprolactam, dimethyl sulfoxide, tetramethylurea, pyridine, dimethylsulfone, hexamethylsulfoxide, γ-butyrolactone, isopropyl alcohol, methoxymethyl pentanol, dipentene, ethyl amyl ketone, methyl nonyl ketone, methyl ethyl ketone, methylisoamylketone, methyl isopropyl ketone, methyl cellosolve, ethyl cellosolve, methyl cellosolve acetate, ethyl cellosolve acetate, butyl carbitol, ethyl carbitol, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol monomethyl ether acetate, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxy butyl acetate, tripropylene glycol methyl ether, 3-methyl-3-methoxy butanol, diisopropyl ether, ethyl isobutyl ether, diisobutylene, amyl acetate, butyl butylate, butyl ether, diisobutyl ketone, methyl cyclohexene, propyl ether, dihexyl ether, dioxane, n-hexane, n-pentane, n-octane, diethyl ether, cyclohexanone, ethylene carbonate, propylene carbonate, methyl ethyl ketone, methyl isobutyl ketone, methyl lactate, ethyl lactate, methyl acetate, ethyl acetate, n-butyl acetate, propylene glycol acetate monoethyl ether, methyl pyruvate, ethyl pyruvate, 3-methoxy methyl propionate, 3-ethoxy methyl propionate ethyl, 3-methoxy ethyl propanoate, 3-ethoxypropionic acid, 3-methoxypropionic acid, 3-methoxypropionic acid propyl, 3-methoxy butyl propionate, diglyme, 4-hydroxy-4-methyl-2-pentanone, 3-methoxy-N,N-dimethylpropane amide, 3-ethoxy-N,N-dimethylpropane amide, and 3-butoxy-N,N-dimethylpropane amide.

These organic solvents may be used alone, or in combination. Additionally, a solvent which does not dissolve the polymer to be formed may be used in combination with any of the above-described organic solvent within a range which will not deposit the polymer to be formed.

Additionally, the organic solvent is preferably deaerated to a possible degree, because the oxygen in the organic solvent can inhibit polymerization reaction during radical polymerization.

The polymerization temperature during radical polymerization may be any temperature selected from 30° C. to 150° C., but is preferably within the range of 50° C. to 100° C. Additionally, the reaction may be carried out at any concentration, but the monomer concentration is preferably 1% by mass to 50% by mass, more preferably 5% by mass to 30% by mass, because too low concentrations make it difficult to obtain a polymer with a high molecular weight, and too high concentrations increases the viscosity of the reaction liquid, and hinders uniform stirring. The initial stage of the reaction is carried out at a high concentration, and then an organic solvent may be added.

In the radical polymerization reaction, since the molecular weight of the polymer to be obtained decreases when the proportion of the radical polymerization initiator is great with reference to the monomer, and the molecular weight of the polymer to be obtained increases when the proportion is small, so that the proportion of the radical initiator is preferably 0.1 mol % to 10 mol % with reference to the monomer to be polymerized. Additionally, various monomer components and solvents, and initiators may be added during polymerization.

[Collection of Polymer]

When the polymer having the site having an isocyanate group and/or a blocked isocyanate group, and the site having photoalignment formed by the above-described reaction is collected from its reaction solution, the reaction solution is poured into a poor solvent, and the polymer is precipitated. Examples of the poor solvent used for precipitation include methanol, acetone, hexane, heptane, butyl cellosolve, heptane, ethanol, toluene, benzene, diethyl ether, methyl ethyl ether, and water. The polymer poured into and precipitate in the poor solvent may be collected by filtration, and dried at room temperature or by heating under normal pressure or in vacuo. Furthermore, impurities in the polymer can be reduced by repeating re-dissolving the precipitated and collected polymer in an organic solvent, and re-collecting the precipitate two to ten times. Examples of the poor solvent used herein include alcohols, ketones, and hydrocarbon. The use of three or more kinds of poor solvents selected from them is preferred for further increasing the efficiency of purification.

The molecular weight of the polymer of the present invention is preferably 2000 to 1000000, and more preferably 5000 to 100000 in terms of weight average molecular weight as measured by the GPC (Gel Permeation Chromatography) method, in consideration of the strength of the coating film to be obtained, workability during formation of the coating film, and uniformity of the coating film.

[Preparation of Liquid Crystal Aligning Agent]

The liquid crystal aligning agent used in the present invention (more specifically, polymer composition) is preferably prepared in the form of a coating solution which is suitable for the formation of a liquid crystal alignment film. More specifically, the liquid crystal aligning agent of the present invention is preferably prepared in the form of a solution of the resin component for forming a resin film dissolved in an organic solvent. The resin component is the above-described specific polymer (component (A)). The content of the resin component is preferably 1% by mass to 20% by mass, more preferably 2% by mass to 15% by mass, and particularly preferably 2% by mass to 10% by mass.

Additionally, when the resin component includes a crosslinking compound (component (B))) in addition to the above-described specific polymer (component (A)), the content of the resin component is preferably 1% by mass to 20% by mass, more preferably 3% by mass to 15% by mass, and particularly preferably 3% by mass to 10% by mass.

In the polymer composition of the present embodiment, the above-described resin component may be entirely the polymer having the site having an isocyanate group and/or a blocked isocyanate group, the site having alignment, and the site having at least one functional group selected from the group consisting of an amino group and a hydroxyl group in each molecule, or may further contain other polymer within the range which will not impair photoalignment capability and crosslinking reactivity. At this time, the content of the other polymer in the resin component is 0.5% by mass to 90% by mass, and preferably 1% by mass to 80% by mass.

Examples of the other polymer include the polymers which are composed of poly(meth)acrylate or polyamic acid or polyimide, and not the polymers including a site having an isocyanate group and/or a blocked isocyanate group, and a site having photoalignment.

<Organic Solvent>

The organic solvent used in the liquid crystal aligning agent of the present invention is not particularly limited as long as it dissolves the resin component. Specific examples are given below.

N,N-dimethylformamide, N,N-dimethylacetamide, N-methyl-2-pyrrolidone, N-methylcaprolactam, 2-pyrrolidone, N-ethyl pyrrolidone, N-vinylpyrrolidone, dimethyl sulfoxide, tetramethylurea, pyridine, dimethylsulfone, hexamethylsulfoxide, γ-butyrolactone, 3-methoxy-N,N-dimethylpropane amide, 3-ethoxy-N,N-dimethylpropane amide, 3-butoxy-N,N-dimethylpropane amide, 1,3-dimethyl-imidazolidinone, ethyl amylketone, methylnonyl ketone, methyl ethyl ketone, methylisoamylketone, methylisopropyl ketone, cyclohexanone, ethylene carbonate, propylene carbonate, diglyme, 4-hydroxy-4-methyl-2-pentanone, propylene glycol monoacetate, propylene glycol monomethyl ether, propylene glycol monomethyl ether acetate, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxy butyl acetate, and tripropylene glycol methyl ether. These compounds may be used alone, or in combination.

<Other Components>

The liquid crystal aligning agent of the present invention may contain other components besides the above-described properties polymer component.

Examples of the other components include, but not limited to, a crosslinking compound (crosslinking agent), a solvent or a compound which improves film thickness uniformity and surface smoothness when the liquid crystal aligning agent is applied, and a compound which improves adhesion between the liquid crystal alignment film and the substrate.

<<Crosslinking Compound (Crosslinking Agent)>>

The liquid crystal aligning agent of the present invention may contain a dielectric and a conductive substance for the purpose of changing electrical properties such as the dielectric constant and electrical conductivity of the liquid crystal alignment film, and further a crosslinking compound for the purpose of increasing the hardness and compactness of the liquid crystal alignment film, within the range which will not impair the advantageous effect of the present invention.

The crosslinking compound which may be added to the liquid crystal aligning agent of the present invention is preferably a compound (may be referred to as "component (B)") having two or more of one or more types of functional group selected from a group consisting of an amino group and a hydroxyl group in each molecule.

All of the two or more functional groups may be the same (one) type of amino group or hydroxyl group, or two or more amino group or hydroxyl group. The amino group and hydroxyl group may be mixed.

The component (B) of the present invention may be a polymer having repeating units as long as it has two or more of one or more types of functional group selected from the group consisting of an amino group and a hydroxyl group in each molecule.

For example, the polymer having repeating units may have two or more of one or more types of functional group selected from the group consisting of an amino group and a hydroxyl group at its ends.

Additionally, for example, the polymer corresponds to the component (B) of the present invention as long as the polymer has two or more functional groups, even if it is a polymer derived from a monomer having one functional group. More specifically, 2-hydroxyethyl methacrylate (HEMA) is a compound having only one hydroxyl group, and does not correspond to the component (B) of the present invention, but the polymer obtained by polymerizing the HEMA has two or more hydroxyl groups, so that it corresponds to the component (B) of the present invention.

Furthermore, for example, the component (B) of the present invention may be a polymer having repeating units derived from a monomer having two or more functional groups (wherein the functional groups is an amino group and/or a hydroxyl group).

The component (B) can cause crosslinking reaction with the above-described polymer as the component (A), specifically with the isocyanate group in the component (A) (including the isocyanate group formed by dissociation of a block group from a blocked isocyanate group). As a result of this reaction, as described above, a liquid crystal alignment film having high film hardness and stability is obtained. Additionally, curing of the liquid crystal alignment film by crosslinking reaction stabilizes the alignment regulating property and pretilt angles of the liquid crystal induced by subsequent irradiation with polarized ultraviolet light.

In the liquid crystal aligning agent of the present invention, when the component (B) is the above-described polymer having repeating units and a number average molecular weight of 2000 or less, or a compound having no repeating unit, the proportion of the component (B) is 1 to 80% by mass, preferably 1 to 50% by mass, and more preferably 2 to 30% by mass with reference to 100% by mass of the component (A). In other words, the component (A):component (B) is 100:1 to 100:80, preferably 100:1 to 100:50, and more preferably 100:2 to 100:30, in terms of the mass ratio.

Additionally, when the component (B) is a polymer having repeated units and a number average molecular weight of 2000 or more, the content of the component (B) is 5 to 1000% by mass, preferably 5 to 900% by mass, and more preferably 10 to 800% by mass with reference to 100% by mass of the component (A). In other words, the component (A):component (B) is 100:5 to 100:1000, preferably 100:5 to 100:900, and more preferably 100:10 to 100:800 in terms of the mass ratio.

The compound of the component (B) of the present invention is represented by the following formula (5).

wherein T represents an amino group or a hydroxyl group, Y represents an organic group with a valence m, and m is an integer of 2 or more.

In the above-described formula, m is 2 or more, and is m is preferably a large number for promoting the crosslinking reaction with a specific polymer.

$$(T)_m Y \qquad (5)$$

The compound having two or more amino groups in each molecule may be a common diamine compound or triamine compound, tetraamine compound, or polyamine compound.

Specific examples of Y when m is 2 include, but not limited to, the following formulae (Y-1) to (Y-120).

Among them, when a liquid crystal alignment film for increasing the pretilt angles of liquid crystal is made, Y is preferably a structure prepared from a diamine compound having a long-chain alkyl group (for example, an alkyl group having a carbon number of 10 or more), an aromatic ring, an aliphatic ring, a steroid skeleton, or a combination of them Examples of the Y include, but not limited to, (Y-83), (Y-84), (Y-85), (Y-86), (Y-87), (Y-88), (Y-89), (Y-90), (Y-91), (Y-92), (Y-93), (Y-94), (Y-95), (Y-96), (Y-97), (Y-98), (Y-99), (Y-100), (Y-101), (Y-102), (Y-103), (Y-104), (Y-105), (Y-106), (Y-107), and (Y-108).

Additionally, for improving the electrical properties of the liquid crystal display element, for example, (Y-31), (Y-40), (Y-64), (Y-65), (Y-66), (Y-67), (Y-109), and (Y-110) are preferred.

Additionally, the specific polymer includes a photoreactive site, which may be used in combination with, for example, (Y-17), (Y-18), (Y-111), (Y-112), (Y-113), (Y-114), (Y-115), (Y-116), (Y-117), (Y-118), or (Y-119) having photoreactivity.

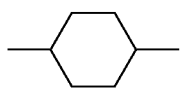

(Y-1)

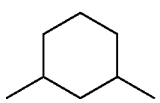

(Y-2)

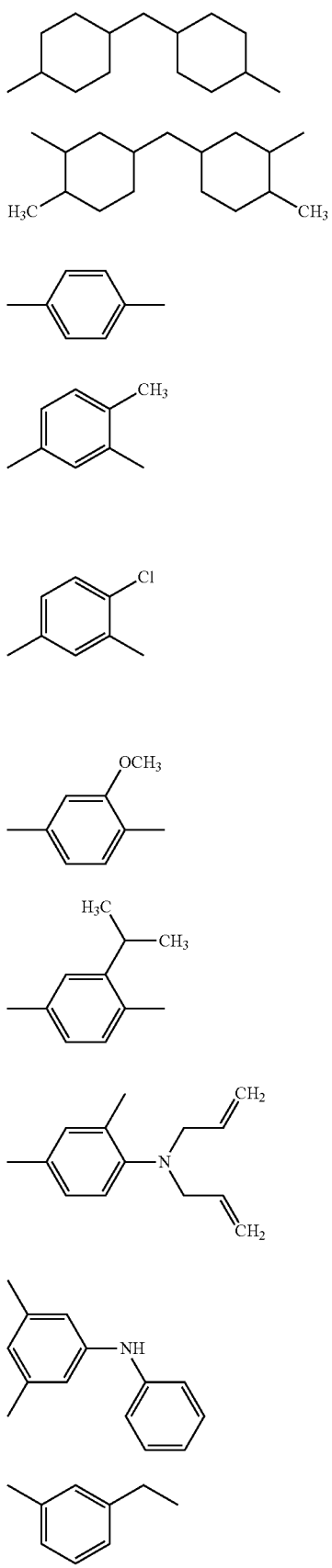

-continued
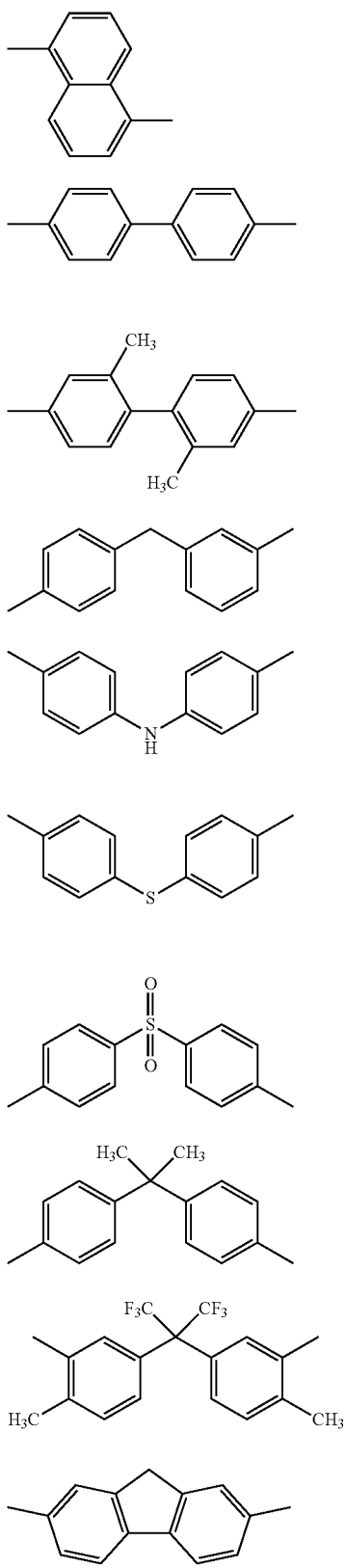
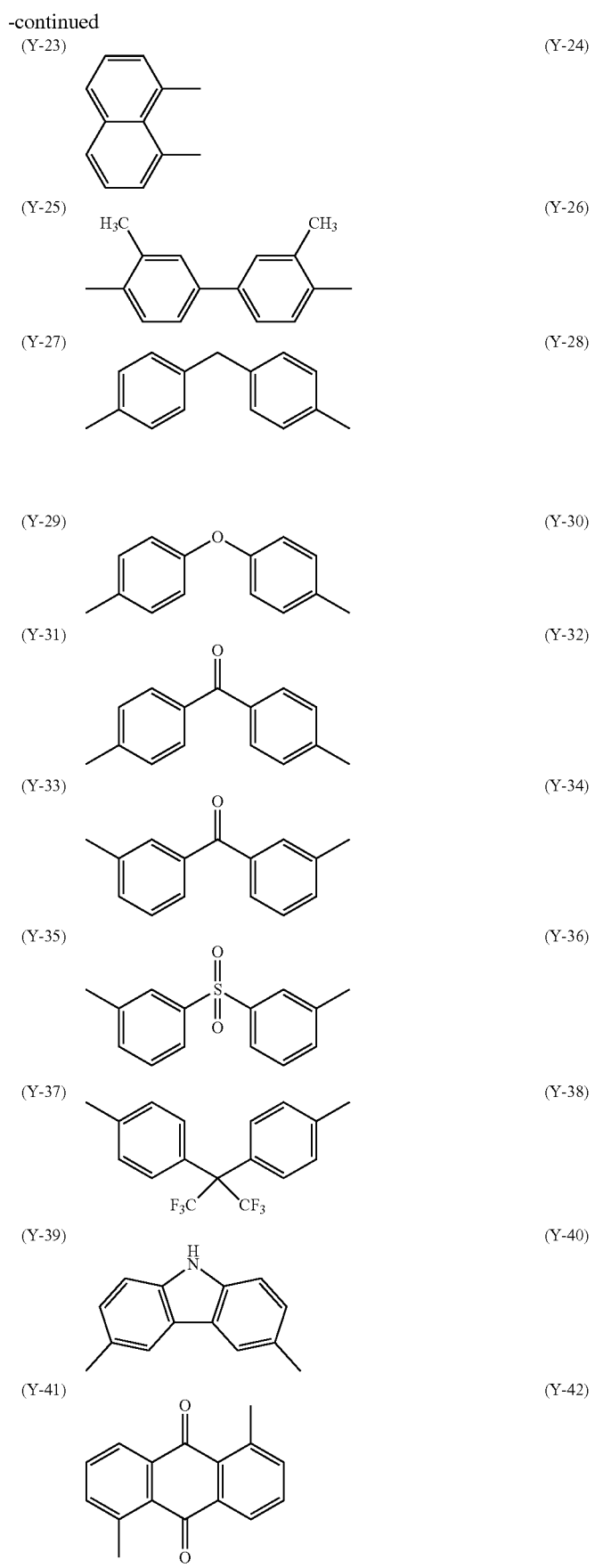

-continued
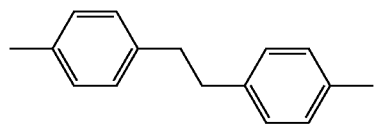 (Y-43)
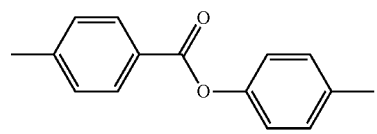 (Y-44)
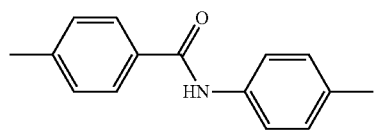 (Y-45)
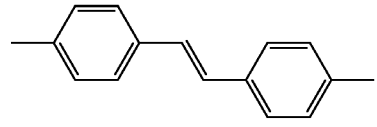 (Y-46)
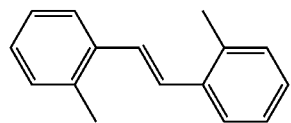 (Y-47)
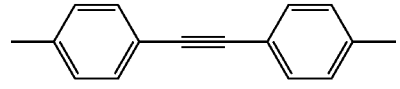 (Y-48)
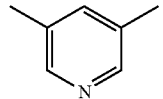 (Y-49)
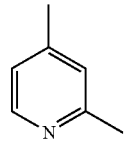 (Y-50)
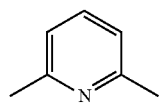 (Y-51)
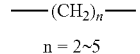 (Y-52)
n = 2~5
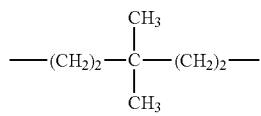 (Y-53)
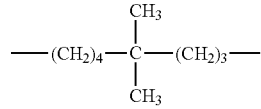 (Y-54)
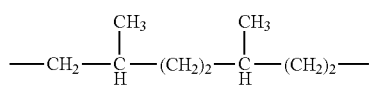 (Y-55)
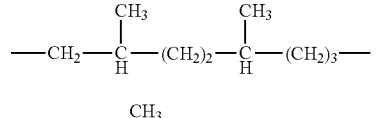 (Y-56)
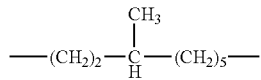 (Y-57)
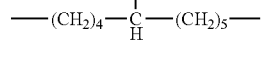 (Y-58)
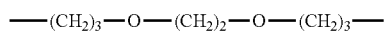 (Y-59)
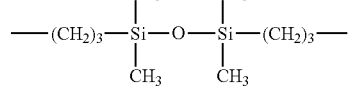 (Y-60)
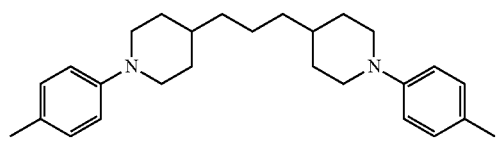 (Y-61)
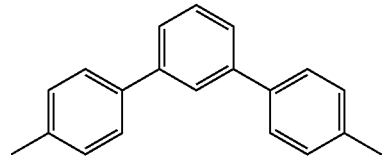 (Y-62)
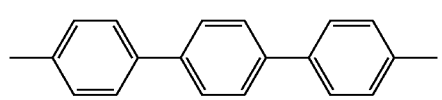 (Y-63)
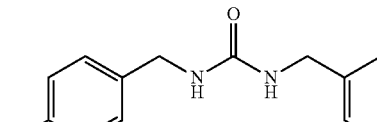 (Y-64)
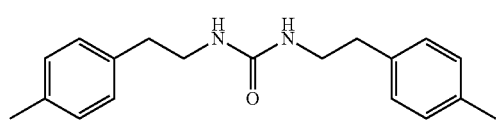 (Y-65)
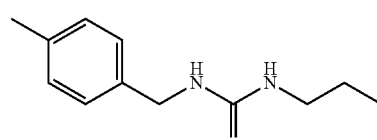 (Y-66)

-continued
(Y-67)
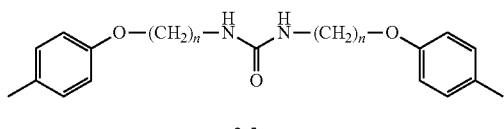
n = 2-5
(Y-68)
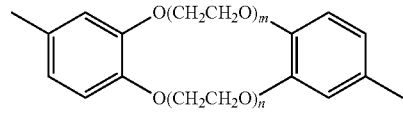
m, n = 2-4
(Y-69)
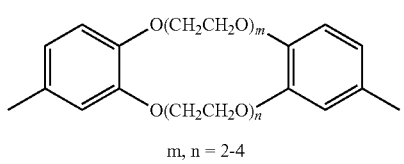
m, n = 2-4
(Y-70)
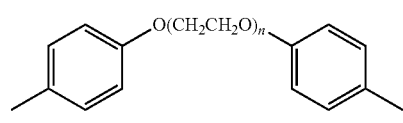
n = 2-4
(Y-71)
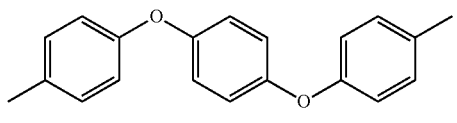
(Y-72)
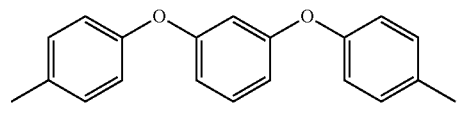
(Y-73)
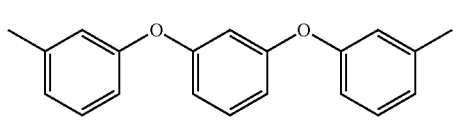
(Y-74)
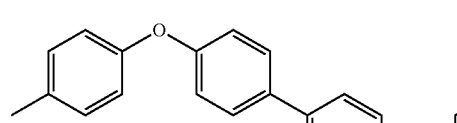
(Y-75)
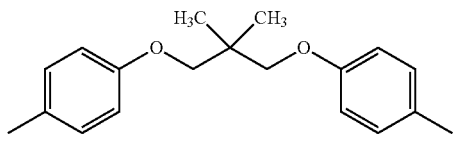
(Y-76)
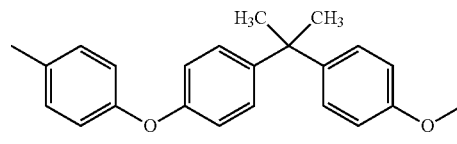
(Y-77)
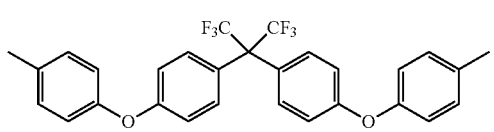
(Y-78)
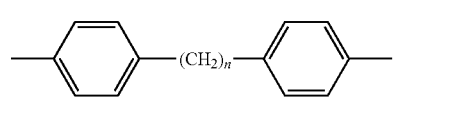
n = 3~5
(Y-79)
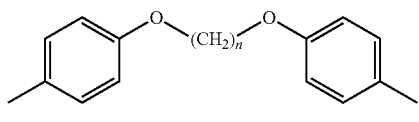
n = 2~5
(Y-80)
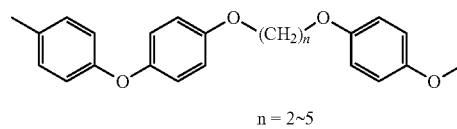
n = 2~5
(Y-81)
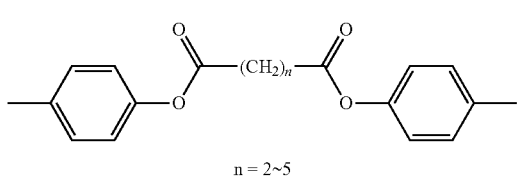
n = 2~5
(Y-82)
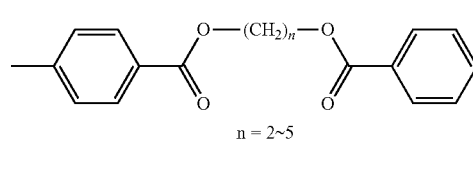
n = 2~5
(Y-84)
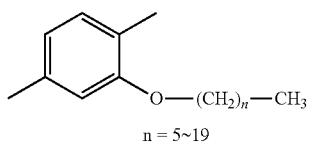
n = 5~19
(Y-85)
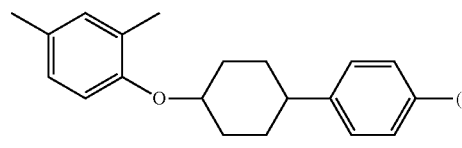
n = 0~21

-continued
(Y-86)
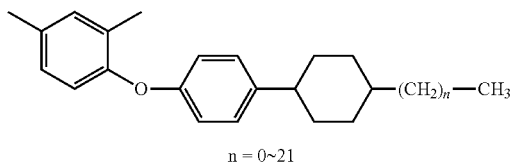
n = 0~21
(Y-87)
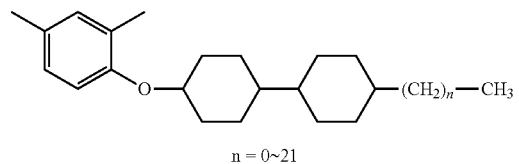
n = 0~21
(Y-88)
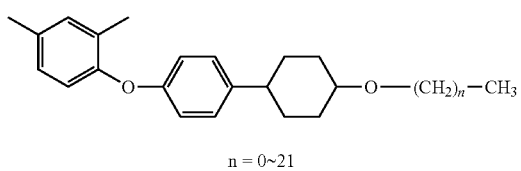
n = 0~21
(Y-89)
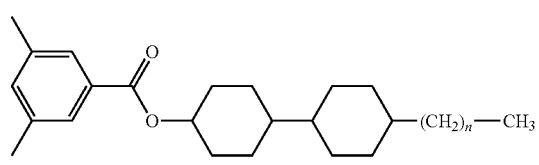
n = 0~21
(Y-90)
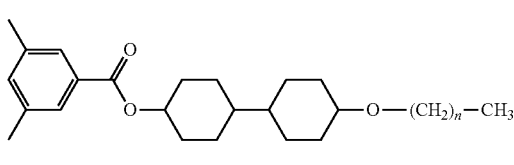
n = 0~21
(Y-91)
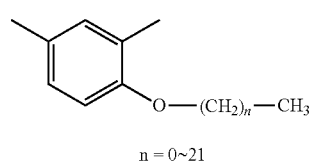
n = 0~21
(Y-92)
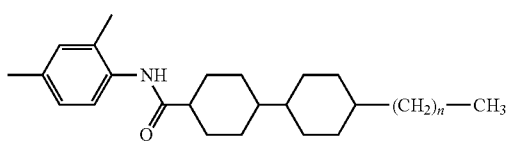
n = 0~21
(Y-93)
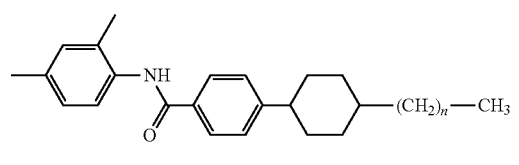
n = 0~21
(Y-94)
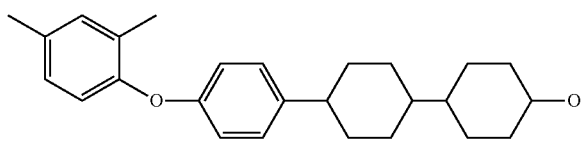
n = 0~21
(Y-95)
n = 0~21
(Y-96)
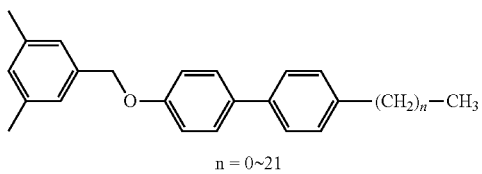
n = 0~21
(Y-97)
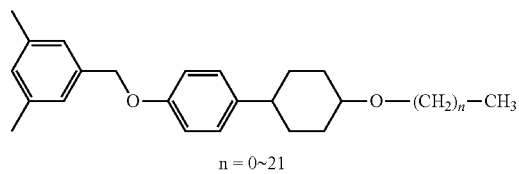
n = 0~21
(Y-98)
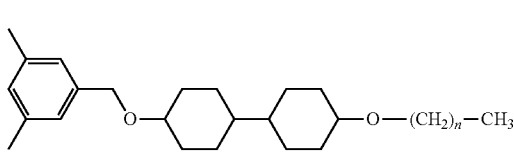
n = 0~21
(Y-99)
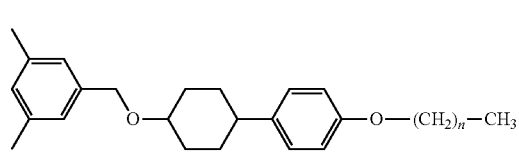
n = 0~21
(Y-100)
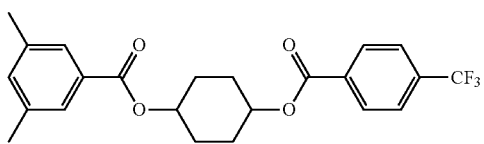
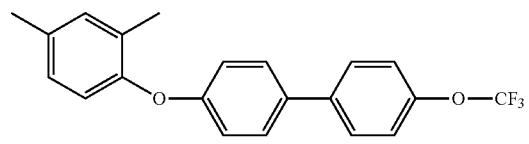

-continued
(Y-101)
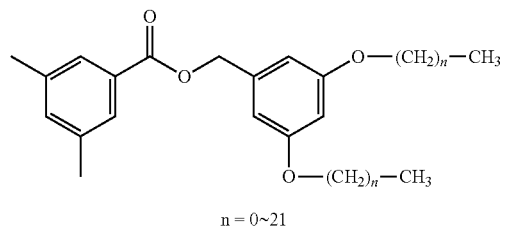
n = 0~21
(Y-102)
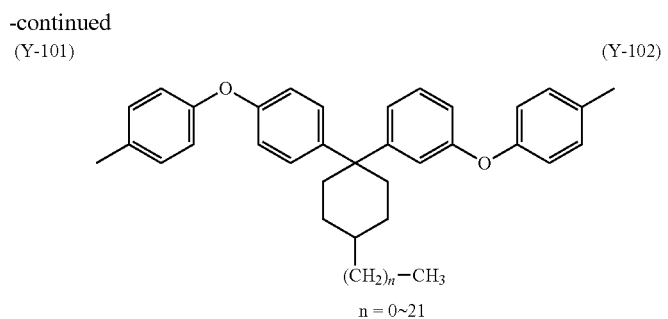
n = 0~21
(Y-103)
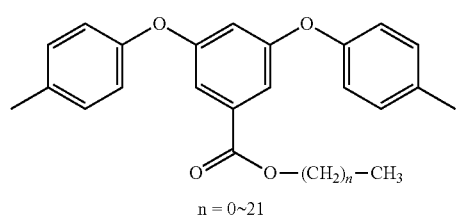
n = 0~21
(Y-104)
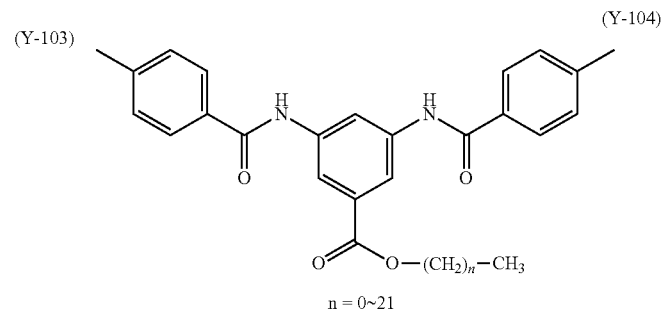
n = 0~21
(Y-105)
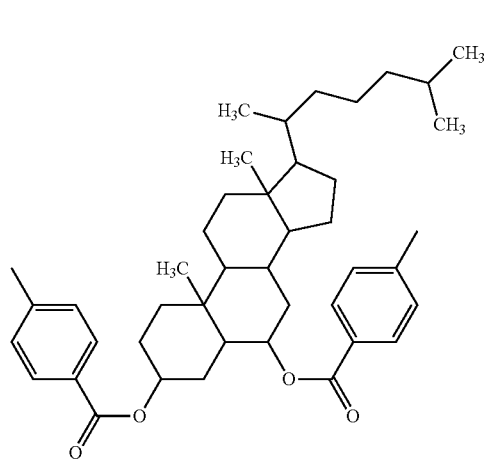
(Y-106)
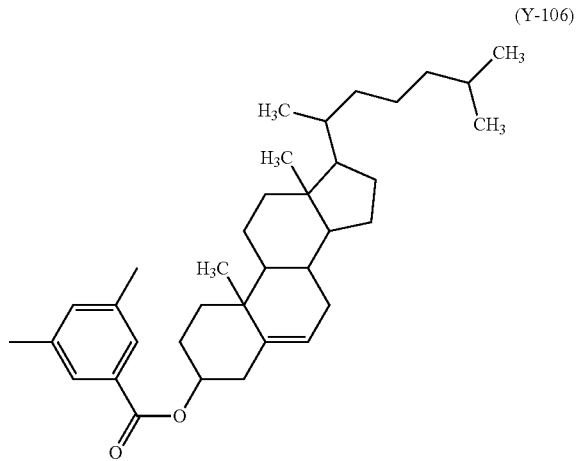
(Y-107)
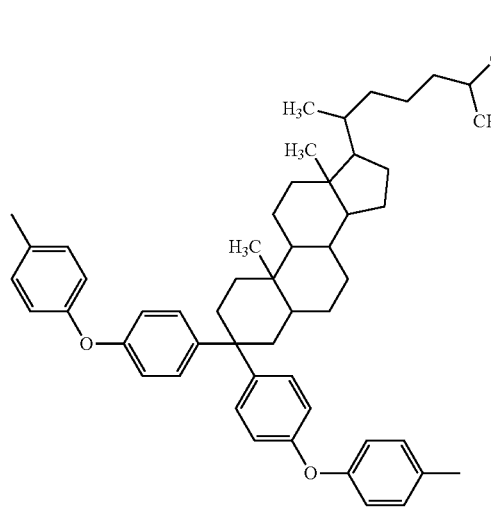
(Y-108)
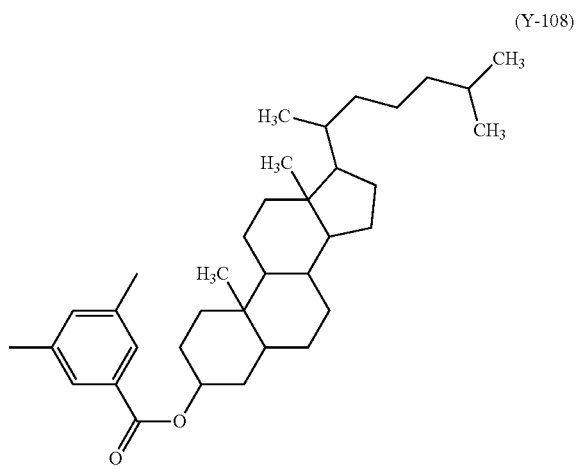

-continued
(Y-109)
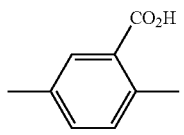
(Y-110)
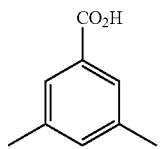
(Y-111)
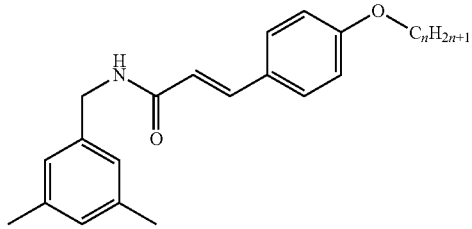
n = 0~21
(Y-112)
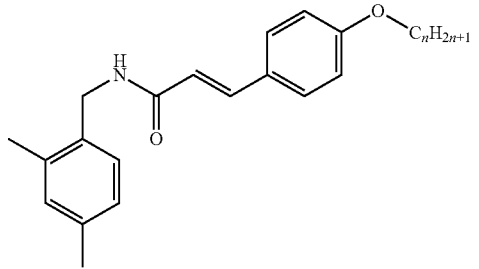
n = 0~21
(Y-113)
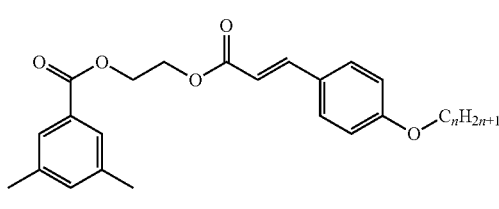
n = 1~20
(Y-114)
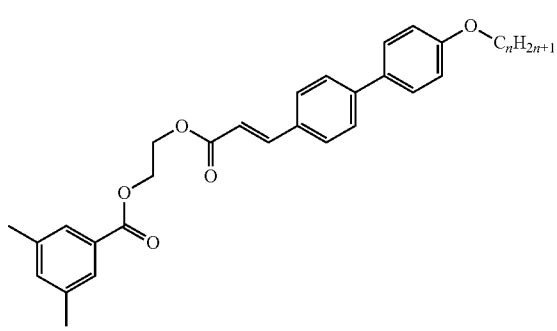
n = 1~20
(Y-115)
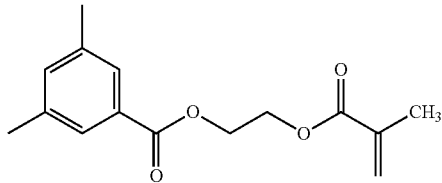
(Y-116)
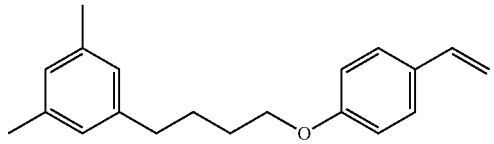
(Y-117)
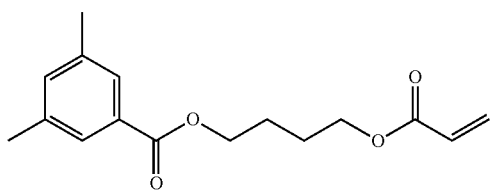
(Y-118)
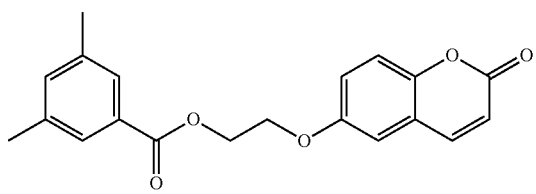
(Y-119)
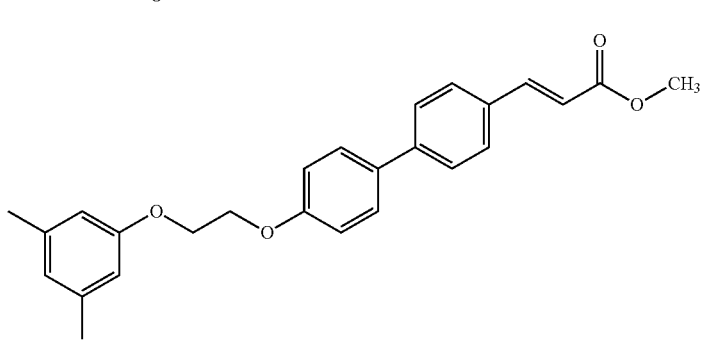

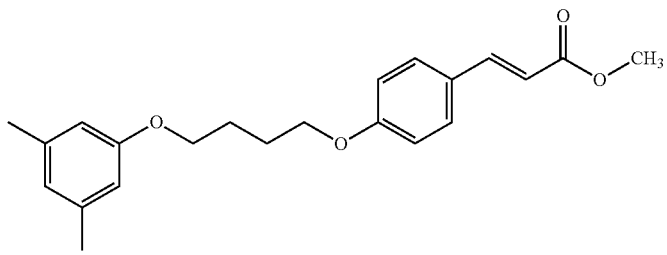
(Y-120)
Additionally, in the compound represented by the above-described formula, specific examples of Y wherein m is 3 or more include, but not limited to, the trivalent or more organic group represented by the following formula, and the structure from which the hydrogen atoms of the (Y-1) to (Y-120) are detached. In the present description, Me is a methyl group.
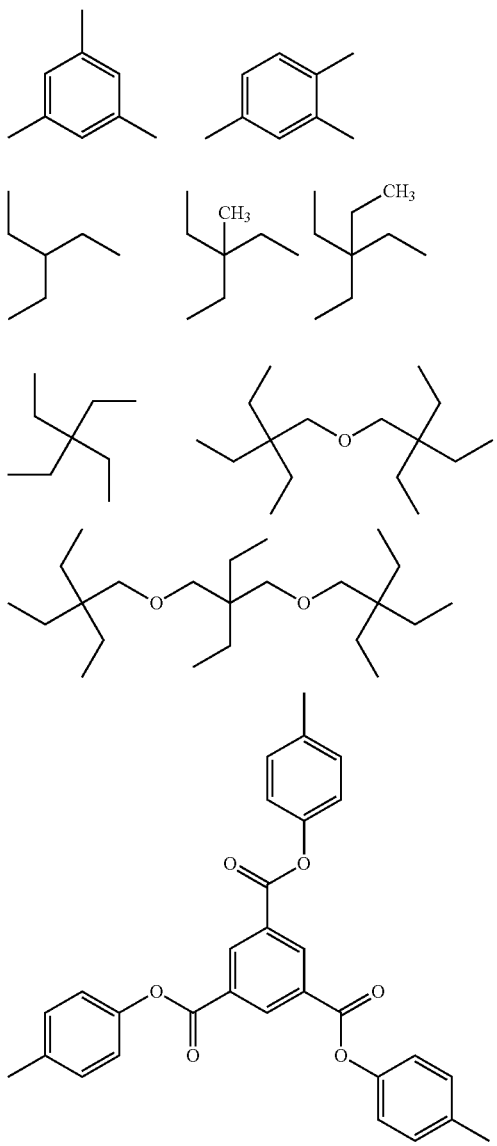
-continued
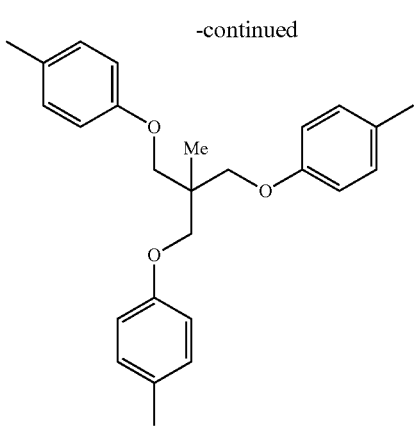
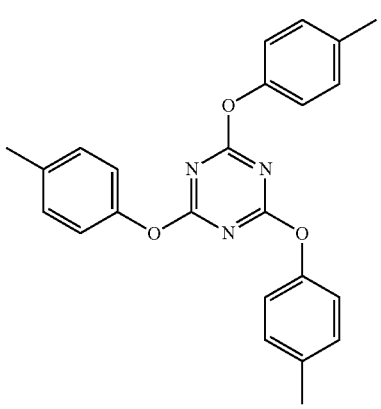
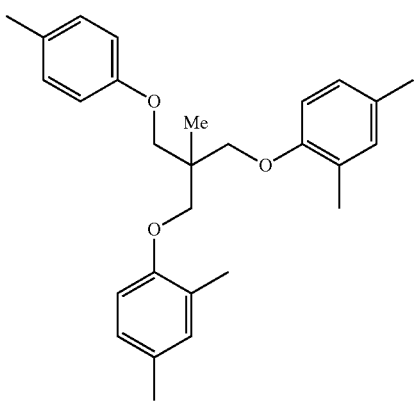

-continued

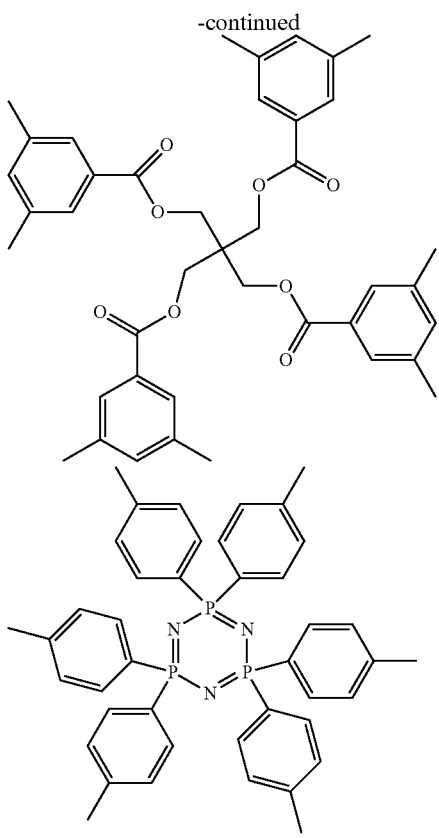

The compound having two or more hydroxyl groups in each molecule may be a common diol compound, a triol compound, a tetraol compound, a polyol compound, or a polymer having a plurality of hydroxyl groups in each molecule.

Specific examples when m is 2 include, but not limited to 1,4-butanediol, 1,5-pentanediol, 1,6-hexanediol, 1,7-heptanediol, 1,8-octanediol, 1,9-nonanediol, 1,10-decanediol, 1,11-dodecanediol, the divalent or higher multivalent organic group organic groups represented by the following formulae (6) to (8), and the structures wherein Y is (Y-1) to (Y-120).

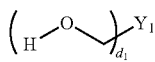 (6)

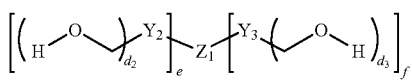 (7)

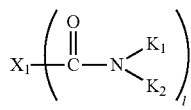 (8)

$Y_1$, $Y_2$, and $Y_3$ each independently represent an aromatic ring. Any hydrogen atom in the aromatic ring may be substituted with a hydroxyl group, an alkyl group having a carbon atom number of 1 to 3, a halogen atom, an alkoxy group having a carbon atom number of 1 to 3, or a vinyl group.

$Z_1$ is a single bond, a divalent saturated hydrocarbon group having a carbon number of 1 to 10 which may be entirely or partially bonded to form a cyclic structure and any hydrogen atom may be substituted with a fluorine atom, —NH—, —N(CH$_3$)—, or the group represented by the formula (9).

$X_1$ is an aliphatic hydrocarbon group having a carbon number of 1 to 20, or a monovalent organic group including an aromatic hydrocarbon group.

The I is an integer of 2 to 6, $d_1$ is an integer of 2 to 4, $d_2$ and $d_3$ are each independently an integer of 1 to 3, and e and f are each independently an integer of 1 to 3.

$K_1$ and $K_2$ are each independently a hydrogen atom, an alkyl group having a carbon number of 1 to 4 which may have a substituent, alkenyl group having a carbon number of 2 to 4 which may have a substituent, or an alkynyl group having a carbon number of 2 to 4 which may have a substituent. Additionally, $K_1$ and/or $K_2$ represent a hydrocarbon group substituted with a hydroxy group. The I in the formula (8) is preferably 2 to 4 from the viewpoint of solubility.

$$-P_1-Q_1-P_2- \qquad (9)$$

In the formula (9), $P_1$ and $P_2$ are each independently an alkylene group having a carbon number of 1 to 5, and $Q_1$ represents an aromatic ring.

The —CH$_2$—OH group in the formula (6) and the formula (7) is directly bonded to an aromatic ring, so that $Y_1$, $Y_2$, and $Y_3$ are each independently an aromatic ring.

Specific examples of the aromatic ring include a benzene ring, a naphthalene ring, a tetrahydronaphthalene ring, an azulene ring, an indene ring, a fluorene ring, an anthracene ring, a phenanthrene ring, a phenalene ring, a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a benzimidazole ring, a tinoline ring, a phenanthroline ring, an indole ring, a quinoxaline ring, a benzothiazole ring, a phenothiazine ring, an acridine ring, and an oxazole ring. More preferred specific examples of the aromatic ring include a benzene ring, a naphthalene ring, a fluorene ring, an anthracene ring, a pyrrole ring, an imidazole ring, a pyrazole ring, a pyridine ring, a pyrimidine ring, a quinoline ring, an isoquinoline ring, a carbazole ring, a pyridazine ring, a pyrazine ring, a benzimidazole ring, a benzimidazole ring, an indole ring, a quinoxaline ring, and an acridine ring. Even more preferred examples are a benzene ring, a naphthalene ring, a pyridine ring, a carbazole ring, and most preferred examples are a benzene ring and a pyridine ring.

The hydrogen atoms of these aromatic rings may be substituted with a hydroxyl group, an alkyl group having a carbon atom number of 1 to 3, a halogen atom, an alkoxy group having a carbon number of 1 to 3, or a vinyl group.

In the formula (7), $d_2$ and $d_3$ are more preferably an integer of 1 or 2. Additionally, e and f are more preferably 1 or 2.

When $Z_1$ in the formula (7) is a divalent saturated hydrocarbon group having a carbon number of 1 to 10, preferably 1 to 5 which may be entirely or partially bonded to form a cyclic structure, its any hydrogen atom may be substituted with a fluorine atom.

Examples of $Z_1$ include an alkylene group having a carbon number of 1 to 10, an alicyclic hydrocarbon group having a carbon number of 3 to 10, and a group composed of an alkylene group and an alicyclic hydrocarbon group, and having a carbon number of 1 to 10. Additional examples include the above-described groups wherein any hydrogen atoms are substituted with a fluorine atom.

The $Q_1$ in the formula (8) is an aromatic ring, and its specific examples include a benzene ring, a naphthalene ring, a tetrahydronaphthalene ring, an azulene ring, an indene ring, a fluorene ring, an anthracene ring, a phenanthrene ring, a phenalene ring, a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a benzimidazole ring, a tinoline ring, a phenanthroline ring, an indole ring, a quinoxaline ring, a benzothiazole ring, a phenothiazine ring, an acridine ring, and an oxazole ring. More preferred specific examples of the aromatic ring include a benzene ring, a naphthalene ring, a fluorene ring, an anthracene ring, a pyrrole ring, an imidazole ring, a pyrazole ring, a pyridine ring, a pyrimidine ring, a quinoline ring, an isoquinoline ring, a carbazole ring, a pyridazine ring, a pyrazine ring, a benzimidazole ring, a benzimidazole ring, an indole ring, a quinoxaline ring, and an acridine ring. Even more preferred examples are a benzene ring, a naphthalene ring, a pyridine ring, a carbazole ring, and a fluorene ring.

In the formula (8), $K_1$ and/or $K_2$ is preferably the structure represented by the formula (10) from the viewpoint of reactivity, and even more preferably the structure represented by the following formula (11).

In the formula (8), $K_3$ to $K_6$ each independently represent a hydrogen atom, a hydrocarbon group, or a hydrocarbon group substituted with a hydroxy group.

$$\begin{array}{c} K_3 \quad K_5 \\ | \quad | \\ -C-C-OH \\ | \quad | \\ K_4 \quad K_6 \end{array} \quad (10)$$

$$\begin{array}{c} H \quad H \\ | \quad | \\ -C-C-OH \\ | \quad | \\ H \quad H \end{array} \quad (11)$$

Specific examples of the specific compound used in the present invention include, but not limited to, the compounds [P1] to [P37].

The specific compound which is the component (B) is preferably the compound represented by [P9], [P11], [P12], [P15], [P18], [P21], [P22], [P27], [P29] to [P37], among them, the compounds represented by [P9], [P11], [P12], [P15], and [P29] are more preferred.

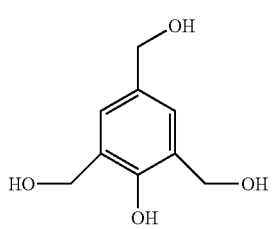

[P1]

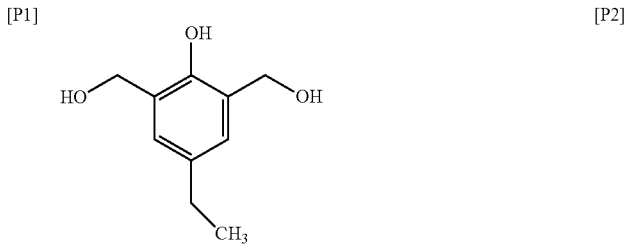

[P2]

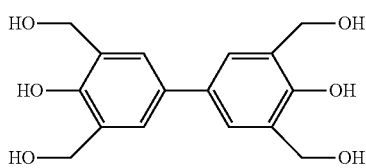

[P3]

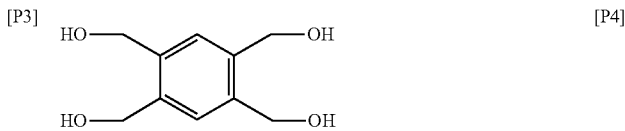

[P4]

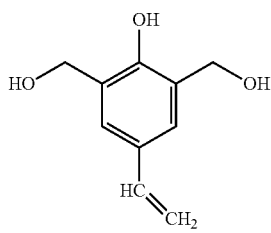

[P5]

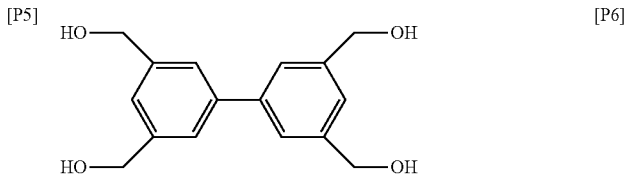

[P6]

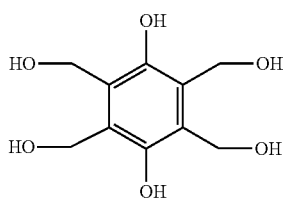

[P7]

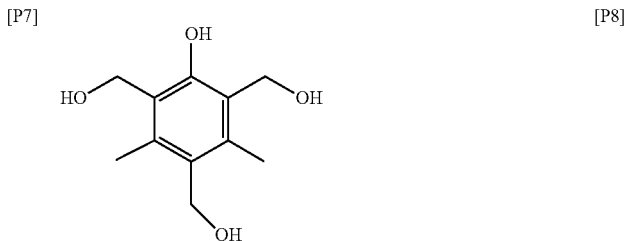

[P8]

-continued
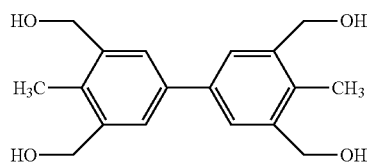
[P9]
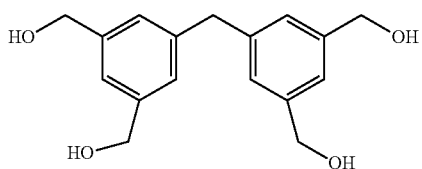
[P10]
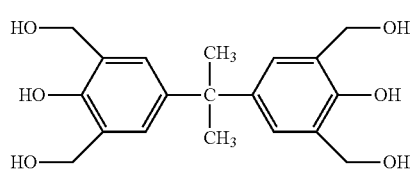
[P11]
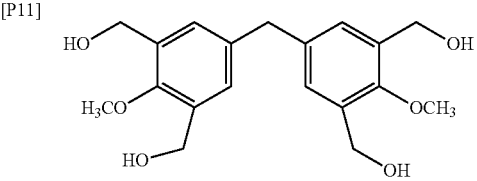
[P12]
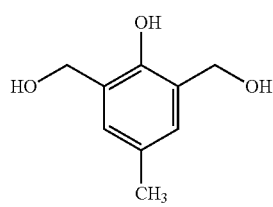
[P13]
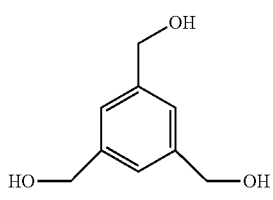
[P14]
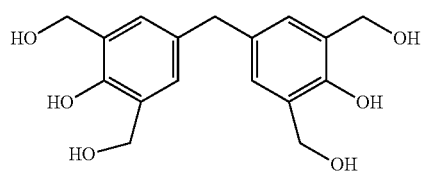
[P15]
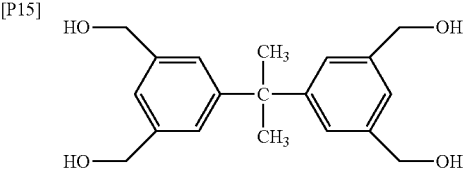
[P16]
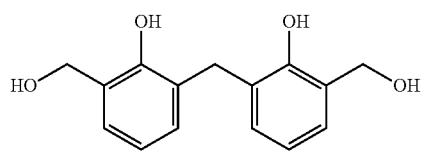
[P17]
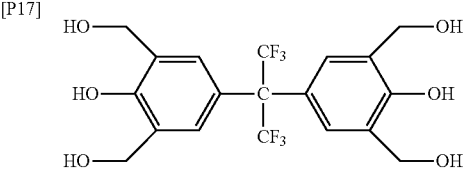
[P18]
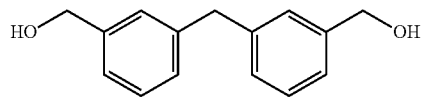
[P19]
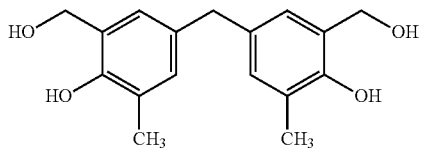
[P20]
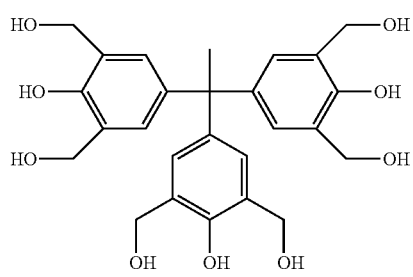
[P21]
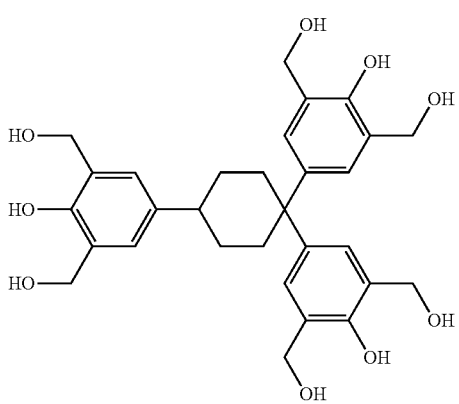
[P22]

-continued
[P23]
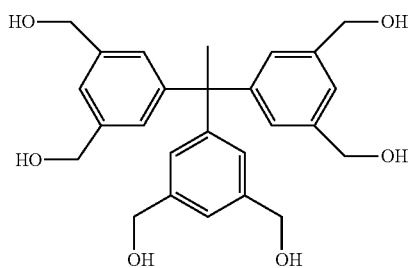
[P24]
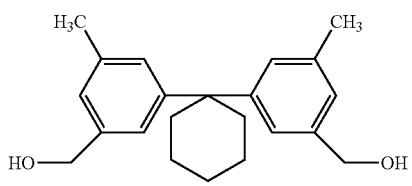
[P25]
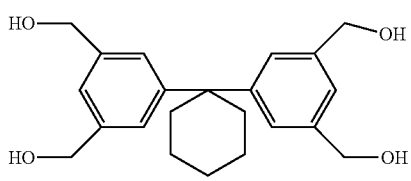
[P26]
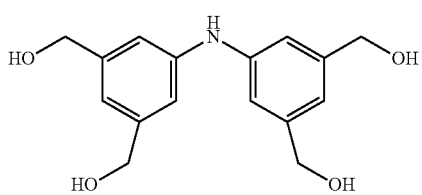
[P27]
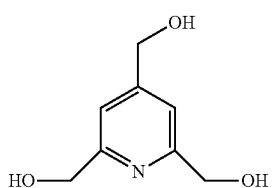
[P28]
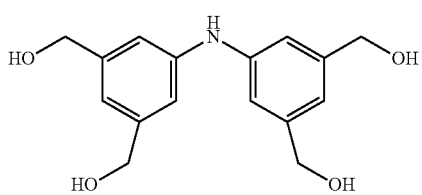
[P29]
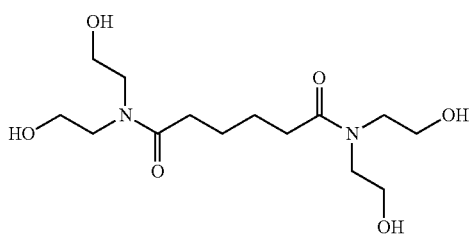
[P30]
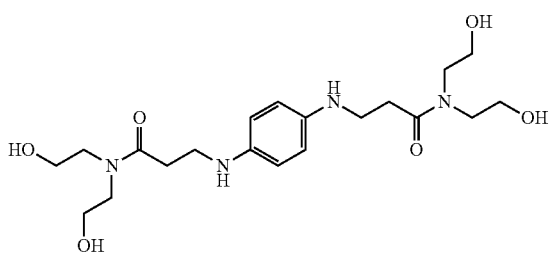
[P31]
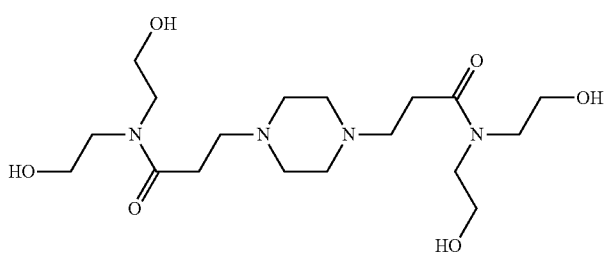
[P32]
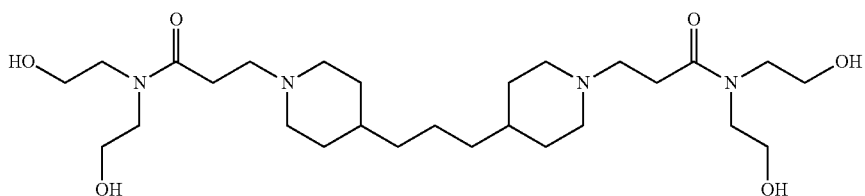
[P33]
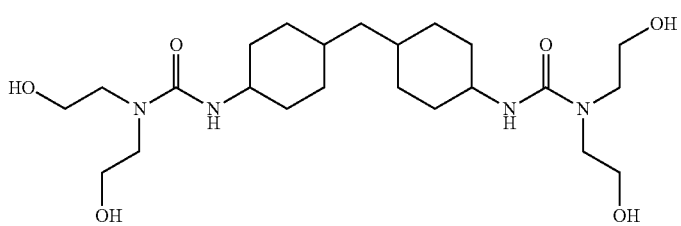

-continued

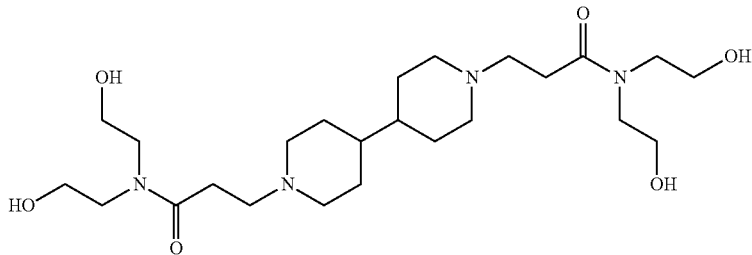

[P34]

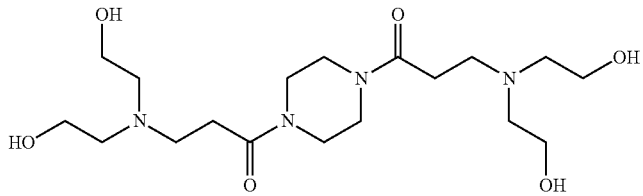

[P35]

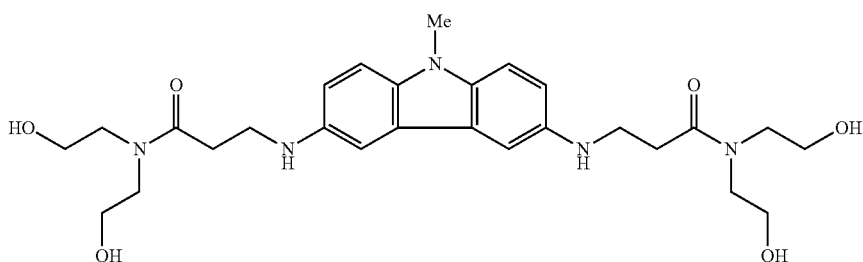

[P36]

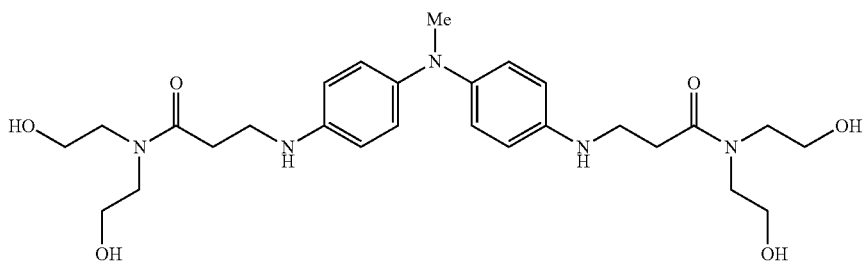

[P37]

<<Solvent for Improving Uniformity of Film Thickness and Surface Smoothness>>

Specific examples of the solvent (poor solvent) for improving the uniformity of film thickness and surface smoothness include the following.

Solvents having low surface tension such as isopropyl alcohol, methoxymethylpentanol, methyl cellosolve, ethyl cellosolve, butyl cellosolve, methyl cellosolve acetate, ethyl cellosolve acetate, butyl carbitol, ethyl carbitol, ethyl carbitol acetate, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxybutanol, diisopropyl ether, ethyl isobutyl ether, diisobutylene, amyl acetate, butyl butyrate, butyl ether, diisobutyl ketone, methylcyclohexene, propyl ether, dihexyl ether, 1-hexanol, n-hexane, n-pentane, n-octane, diethyl ether, methyl lactate, ethyl lactate, methyl acetate, ethyl acetate, n-butyl acetate, propylene glycol acetate monoethyl ether, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, methyl lactate, ethyl lactate, n-propyl lactate, n-butyl lactate, and isoamyl lactate.

These poor solvents may be used alone or in combination of two or more. In the case of using a solvent described above, the solvent is preferably 5% by mass to 80% by mass of the whole solvent, and more preferably 20% by mass to 60% by mass such that the solubility of the whole solvent contained in the liquid crystal aligning agent is not significantly lowered.

On the other hand, in the case of having an unblocked isocyanate group in the polymer having a site having an isocyanate group and/or a blocked isocyanate group and a site having photoalignment, there is a possibility that the crosslinking reactivity of the polymer would be impaired by reacting isocyanate with a solvent described above containing a hydroxyl group.

<<Compound for Improving Uniformity of Film Thickness and Surface Smoothness>>

Examples of the compound for improving uniformity of film thickness and surface smoothness include fluorine-based surfactants, silicone-based surfactants, and nonionic surfactants.

More specific examples thereof include EFTOP (registered trademark) 301, EF303, and EF352 (manufactured by Tochem Products), MEGAFACE (registered trademark) F171, F173, and R-30 (manufactured by DIC Corporation), Fluorad FC430 and FC431 (manufactured by Sumitomo 3M Ltd.), Asahi Guard (registered trademark) AG710 (manufactured by Asahi Glass Co., Ltd.), and Surflon (registered trademark) S-382, SC101, SC102, SC103, SC104, SC105, and SC106 (manufactured by AGC Seimi Chemical Co., Ltd.). The use ratio of these surfactants is preferably 0.01 parts by mass to 2 parts by mass, and more preferably 0.01 parts by mass to 1 part by mass, with respect to 100 parts by mass of the resin component contained in the polymer composition.

<<Compound that Improves Adhesion Between Liquid Crystal Alignment Film and Substrate>>

Specific examples of the compound that improves the adhesion between the liquid crystal alignment film and the substrate include the functional silane-containing compounds described below.

Examples thereof include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetria mine, 10-trimethoxysily-1,4,7-triazadecane, 10-triethoxysilyl-1,4,7-triazadecane, 9-trimethoxysilyl-3,6-diazononyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, and N-bis(oxyethylene)-3-aminopropyltriethoxysilane.

<<Other Additives>>

Furthermore, for the purpose of preventing deterioration of the electric characteristics and the like due to the backlight when constituting the liquid crystal display element in addition to improving the adhesion between the substrate and the liquid crystal alignment film, epoxy group-containing compound additives shown below may be contained in the liquid crystal aligning agent.

Specific examples of epoxy group-containing compounds include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromoneopentyl glycol diglycidyl ether, 1,3,5,6-tetraglycidyl-2,4-hexanediol, N,N,N',N',-tetraglycidyl-m-xylenediamine, 1,3-bis(N,N-diglycidylaminomethyl) cyclohexane, and N,N,N',N',-tetraglycidyl-4,4'-diaminodiphenylmethane, but the present invention is not limited to these compounds.

In the case of using a compound which improves the adhesion to the substrate, the amount of usage is preferably 0.1 parts by mass to 30 parts by mass and more preferably 1 part by mass to 20 parts by mass with respect to 100 parts by mass of the resin component contained in the liquid crystal aligning agent. When the amount of usage is less than 0.1 parts by mass, the effect of improving the adhesion cannot be expected, and when the amount is more than 30 parts by mass, the alignment property of the liquid crystal may be poor.

A photosensitizer can also be used as an additive for improving photoreactivity of a photoreactive group. Colorless sensitizers and triplet sensitizers are preferable.

Examples of the photosensitizers include aromatic nitro compounds, coumarin (7-diethylamino-4-methylcoumarin, and 7-hydroxy4-methylcoumarin), ketocoumarin, carbonylbiscoumarin, aromatic 2-hydroxyketone, aromatic 2-hydroxyketone substituted with an amino group (2-hydroxybenzophenone, and mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-(α-naphthoylmethylene)-3-methylbenzoxazoline, 2-(4-biphenoylmethylene)-3-methylbenzoxazoline, 2-(8-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline), benzothiazole, nitroaniline (m- or p-nitroaniline, and 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene, anthracene (2-naphthalenemethanol, 2-naphthalenecarboxylic acid, 9-anthracenemethanol, and 9-anthracenecarboxylic acid), benzopyran, azoindolizine, and methylcoumarin.

Aromatic 2-hydroxyketone (benzophenone), coumarin, ketocoumarin, carbonylbiscoumarin, acetophenone, anthraquinone, xanthone, thioxanthone, and acetophenone ketal are preferable.

<Liquid Crystal Alignment Film and Liquid Crystal Display Element>

The liquid crystal aligning agent of the present invention can be made into a liquid crystal alignment film by applying it on a substrate, baking, and subjecting the object to alignment treatment by, for example, polarized light irradiation.

The method for applying the liquid crystal aligning agent of the present invention is not particularly limited, and is commonly screen printing, flexographic printing, offset printing, or inkjet. Alternatively, other means using a coating solution such as a dip, a roll coater, a slit coater, or a spinner may be used according to the intended use. The agent is applied on a substrate by any of these methods, and then the solvent is evaporated by a heating means such as a hot plate, thereby forming a coating film.

Baking after applying the liquid crystal aligning agent may be carried out at any temperature from 50 to 300° C., preferably from 80° C. to 250° C., and more preferably from 80° C. to 230° C. This baking operation may be carried out with, for example, a hot plate, a hot air circulation furnace, or an infrared radiation furnace.

The rubbing treatment may use, for example, rayon cloth, nylon cloth, or cotton cloth. If the liquid crystal alignment film is used for vertical alignment, a uniform alignment state is hard to be achieved by rubbing treatment. Therefore, when the liquid crystal aligning agent is used for vertical alignment, it is preferably without rubbing.

Photoalignment treatment is carried out with a linearly polarized ultraviolet exposure apparatus by applying linearly polarized ultraviolet light having a wavelength of 200 nm to 450 nm to a coating film formed on a substrate. The more preferred wavelength of the linearly polarized ultraviolet light is 250 nm to 400 nm.

The liquid crystal cells of the present invention can be made by an ordinary method, and the making method is not particularly limited. According to a common method, a sealing agent is applied on glass substrates at least one of which has a liquid crystal alignment film thereon, a spacer is spread so as to maintain a certain gap, and then the two substrates are bonded together, the sealing agent is cured to make empty cells, then liquid crystal is injected into them under vacuum from a liquid crystal inlet, and the inlet is sealed to make liquid crystal cells; alternatively, liquid crystal is dropped to a substrate onto which a spacer is dispersed, and then the two substrates are bonded together to make liquid crystal cells. The liquid crystal may be selected according to the intended use, and examples include a fluorine liquid crystal and a cyano liquid crystal having positive or negative dielectric constant anisotropy.

As described above, the liquid crystal alignment film obtained from the liquid crystal aligning agent of the present invention can give large pretilt angles to liquid crystal, and thus is useful as a liquid crystal alignment film for vertical alignment purposes.

EXAMPLES

The present invention is specifically describe below with reference to examples, but it is needless to say that the present invention will not be limited these examples.

In Examples, the structure of the (meth)acrylate compound, which is the monomer capable of forming the site having a photoreactive group with photoalignment, is represented by MA-1 to MA-5, and MA-6 to MA-8. MA-1 to MA-5 and MA-8 are novel compounds which are undisclosed in literatures, and the method for synthesizing them is described in the following Synthesis Examples 1 to 6. MA-6 and MA-7 are manufactured by Tokyo Chemical Industry Co., Ltd. In the formulae, "t" means that the cyclohexyl group is in the trans form.

((Meth)Acrylate Monomer)

MA-1

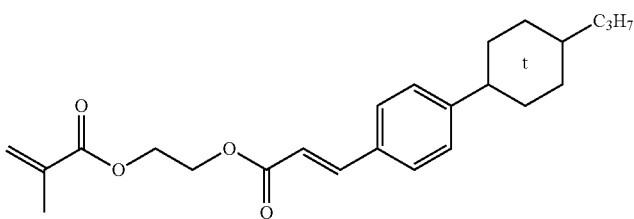

MA-2

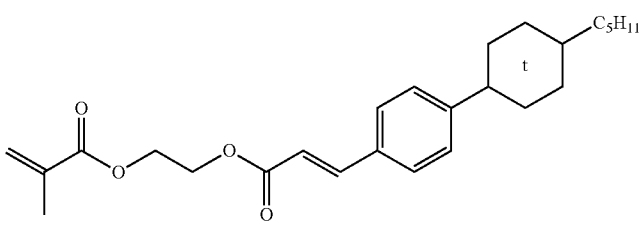

MA-3

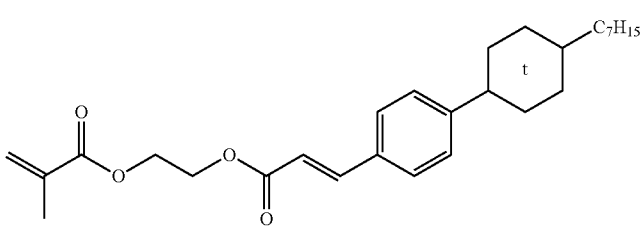

-continued

MA-4

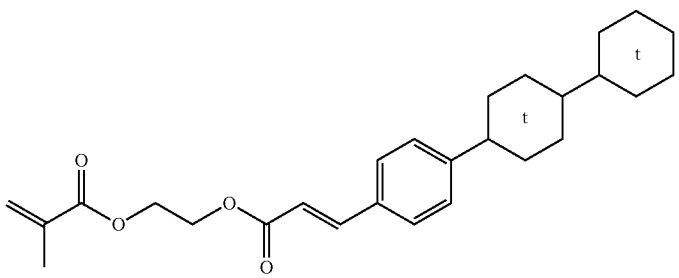

MA-5

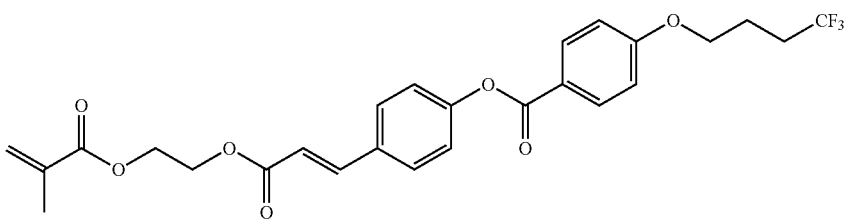

MA-6

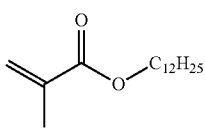

MA-7

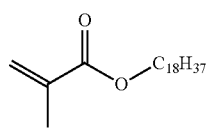

MA-8

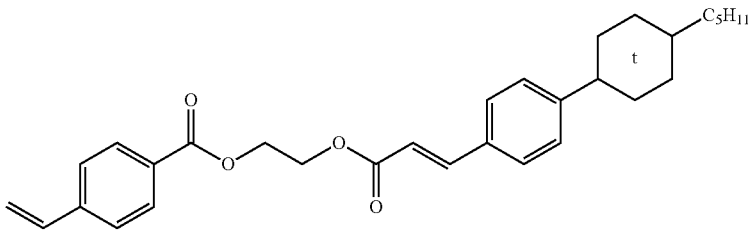

The monomer which can form the site having an isocyanate group and/or a blocked isocyanate group, and the monomer which can form the site having at least one functional group selected from an amino group and a hydroxyl group within each molecule are also represented below.

-continued

HEMA

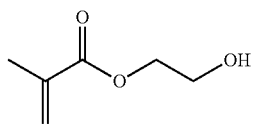

The abbreviations of the compound and organic solvents used in Examples are as follows.

MOI-BM: 2-(0-[1'-methylpropylideneamino]carboxyamino)ethyl methacrylate (Showa Denko K.K., Karenz MOI-BM)

MOI-BP: 2-[(3,5-dimethylpyrazolyl)carbonylamino] ethyl methacrylate (Showa Denko K.K., Karenz MOI-BP)

(Crosslinking Compound (Crosslinking Agent))

MOI-BM

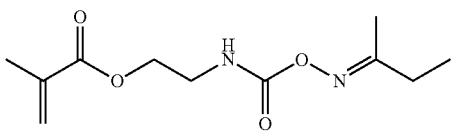

MOI-BP

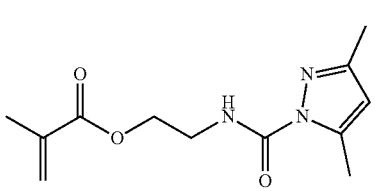

TM-BIP

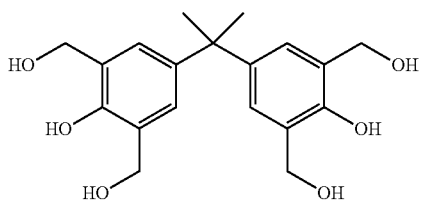

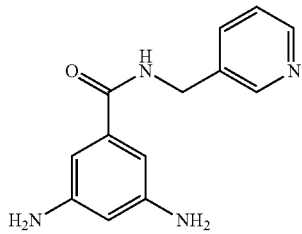

(Organic Solvent)

NMP: N-methyl-2-pyrrolidone

BCS: butyl cellosolve

CHN: cyclohexanone

PGME: propylene glycol monomethyl ether (Polymerization Initiator)

AIBN: 2,2'-azobisisobutyronitrile

<Measurement of ¹HNMR>

Apparatus: Fourier transformation superconductive nuclear magnetic resonance apparatus (FT-NMR) "INOVA-400" (Varian) 400 MHz.

Solvent: deuterated chloroform (CDCl$_3$) or deuterated N,N-dimethyl sulfoxide ([D$_6$]-DMSO).

Reference material: tetramethylsilane (TMS).

Synthesis Example 1

Synthesis of [MA-1]:

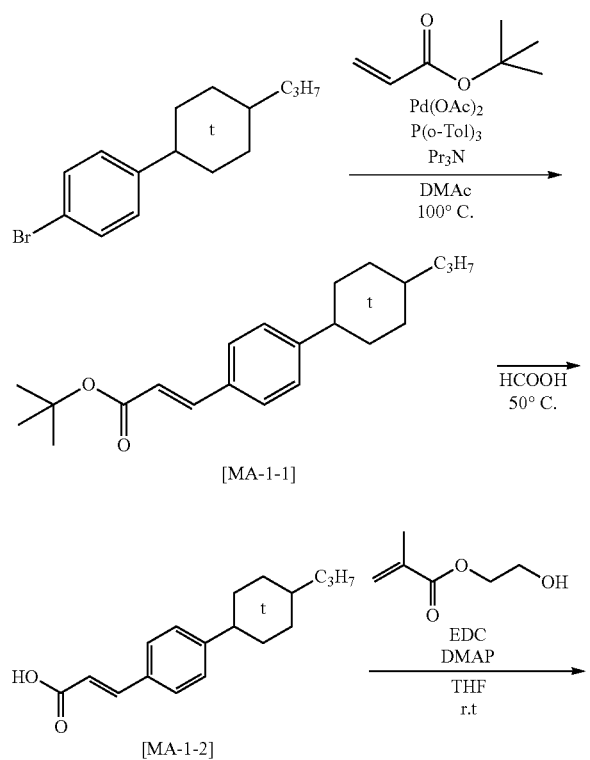

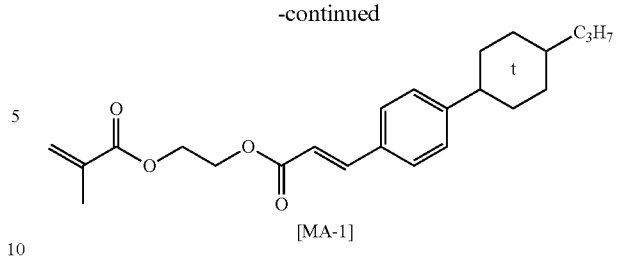

1-bromo-4-(trans-4-propylcyclohexyl)-benzene (150.0 g, 533 mmol), tert-butyl acrylate (102.5 g, 800 mmol), palladium acetate (2.39 g, 11 mmol), tri(o-tolyl)phosphine (6.49 g, 21 mmol), tripropylamine (229.3 g, 1600 mmol), and DMAc (750 g) were placed in a 2-L four-necked flask, and stirred under heating at 100° C. After completion of the reaction, the reaction liquid was filtered to remove insoluble matter, the filtrate was poured to pure water (3.8 L), and neutralized with 12 N—HCl aqueous solution. After neutralization, ethyl acetate (2.5 L) was poured the object, and extraction was carried out. Anhydrous magnesium sulfate was added to the extracted organic layer, the mixture was dried by dehydration, and anhydrous magnesium sulfate was filtrated. The filtrate thus obtained was evaporated to remove the solvent with a rotary evaporator, and the crude product was subjected to repulping washing with cold methanol (180 g), thereby obtaining 144.0 g of [MA-1-1] (white solid) (yield: 82%).

[MA-1-1] (144.0 g, 441 mmol) and formic acid (1000 g) were placed in a 2-L four-necked flask, and stirred under heating at 50° C. After completion of the reaction, the reaction liquid was poured to pure water (3.0 L), the deposit was filtrated. The crude product thus obtained was subjected to repulping washing with ethyl acetate (200 g), thereby obtaining 111.1 g of [MA-1-2] (white solid) (yield: 92%).

The result of ¹H-NMR of the object is given below. This result confirms that the solid thus obtained is the desired [MA-1-2].

1H NMR (400 MHz, [D$_6$]-DMSO): δ12.34 (s, 1H), 7.53-7.60 (m, 3H), 7.25-7.27 (d, 2H), 6.44-6.48 (d, 1H), 2.45-2.51 (t, 1H), 1.76-1.83 (t, 4H), 1.28-1.48 (m, 5H), 1.15-1.21 (m, 2H), 0.97-1.07 (m, 2H), 0.87-0.89 (t, 3H)

[MA-1-2] (30.0 g, 110 mmol), 2-hydroxyethyl methacrylate (17.2 g, 132 mmol), 1-(3-dimethylaminopropyl)-3-ethylcarbodiimide hydrochloride (EDC) (25.7 g, 165 mmol), 4-dimethylaminopyridine (1.35 g, 11 mmol), and THF (150 g) were placed in a 2-L four-necked flask, and stirred at room temperature. After completion of the reaction, the reaction liquid was poured to ethyl acetate (1.0 L), extraction was carried out using pure water (800 mL). Anhydrous magnesium sulfate was added to the extracted organic layer, the mixture was dried by dehydration, and anhydrous magnesium sulfate was filtrated. The filtrate thus obtained was evaporated to remove the solvent with a rotary evaporator. The residue thus obtained was isolated by silica gel column chromatography (ethyl acetate:hexane=1:5 volume ratio), thereby obtaining of 26.8 g [MA-1] (white solid) (yield: 55%). The result of ¹H-NMR of the object is given below. This result confirmed that the solid thus obtained is the desired is [MA-1].

1H NMR (400 MHz, [D$_6$]-DMSO): δ7.62-7.66 (m, 3H), 7.25-7.27 (d, 2H), 6.58-6.62 (d, 1H), 6.05 (s, 1H), 5.70 (s, 1H), 4.37-4.42 (m, 4H), 2.44-2.48 (t, 1H), 1.88 (s, 3H), 1.76-1.82 (t, 4H), 1.24-1.47 (m, 5H), 1.15-1.21 (m, 2H), 0.96-1.06 (m, 2H), 0.85-0.89 (t, 3H)

Synthesis Example 2

Synthesis of [MA-2]

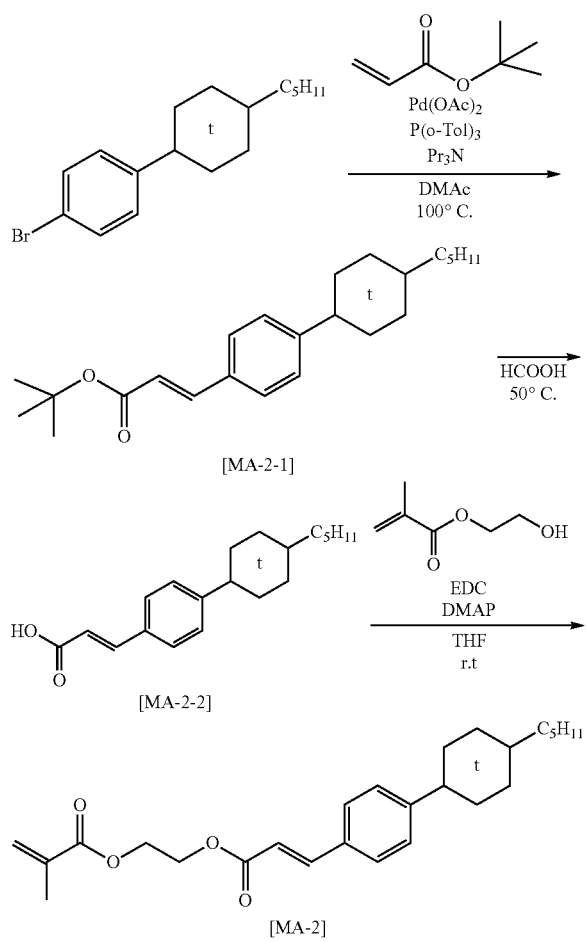

1-bromo-4-(trans-4-pentyl cyclohexyl)-benzene (150.0 g, 485 mmol), tert-butyl acrylate (93.24 g, 728 mmol), palladium acetate (2.18 g, 9.7 mmol), tri(o-tolyl)phosphine (5.90 g, 20 mmol), tripropylamine (208.5 g, 1455 mmol), and DMAc (750 g) were placed in a 2-L four-necked flask, and stirred under heating at 100° C. After completion of the reaction, the reaction liquid was filtered to remove insoluble matter, the filtrate was poured to pure water (3.8 L), and neutralized with a 12 N—HCl aqueous solution. After neutralization, ethyl acetate (2.5 L) was poured, and extraction was carried out. To the extracted organic layer, anhydrous magnesium sulfate was added and dried by dehydration, and the anhydrous magnesium sulfate was filtered. The filtrate thus obtained was evaporated to remove the solvent with a rotary evaporator, and the crude product was subjected to repulping washing with cold methanol (190 g), thereby obtaining 137.0 g of [MA-2-1] (white solid) (yield: 79%).

[MA-2-1] (137.0 g, 384 mmol), formic acid (1000 g) were placed in a 2-L four-necked flask, and stirred under heating at 50° C. After completion of the reaction, the reaction liquid was poured to pure water (3.0 L), and the deposit was filtrated. The crude product thus obtained subjected to repulping washing using ethyl acetate (200 g), thus obtaining 111.8 g of [MA-2-2] (white solid) (yield: 96%). The result of $^1$H-NMR of the object is given below. This result confirmed that the solid thus obtained is the desired [MA-2-2].

1H NMR (400 MHz, [$D_6$]-DMSO): δ12.34 (s, 1H), 7.53-7.60 (m, 3H), 7.25-7.27 (d, 2H), 6.44-6.48 (d, 1H), 2.45-2.51 (t, 1H), 1.77-1.83 (t, 4H), 1.38-1.48 (m, 2H), 1.17-1.34 (m, 9H), 0.97-1.07 (m, 2H), 0.87-0.89 (t, 3H)

[MA-2-2] (30.0 g, 100 mmol), 2-hydroxyethyl methacrylate (15.6 g, 119 mmol), 1-(3-dimethylaminopropyl)-3-ethyl carbodiimide hydrochloride (EDC) (28.7 g, 150 mmol), 4-dimethylaminopyridine (1.22 g, 10 mmol), and THF (150 g) were placed in a 2-L four-necked flask, and stirred at room temperature. After completion of the reaction, the reaction liquid was poured to ethyl acetate (1.0 L), extraction was carried out using pure water (800 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:5 volume ratio), thereby obtaining 36.6 g of [MA-2] (white solid) (yield: 88%). The result of $^1$H-NMR of the object is given below. The result confirmed that the solid thus obtained is the desired [MA-2].

1H NMR (400 MHz, [$D_6$]-DMSO): δ7.62-7.66 (m, 3H), 7.25-7.27 (d, 2H), 6.58-6.62 (d, 1H), 6.04 (s, 1H), 5.70 (s, 1H), 4.36-4.42 (m, 4H), 2.48-2.52 (t, 1H), 1.88 (s, 3H), 1.76-1.83 (t, 4H), 1.36-1.44 (m, 2H), 1.18-1.31 (m, 9H), 1.00-1.03 (m, 2H), 0.85-0.88 (t, 3H)

Synthesis Example 3

Synthesis of [MA-3]

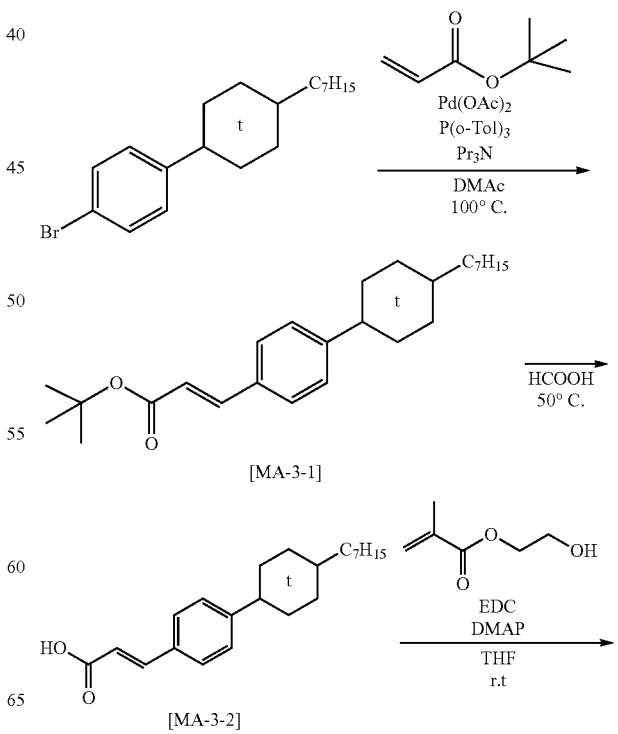

-continued

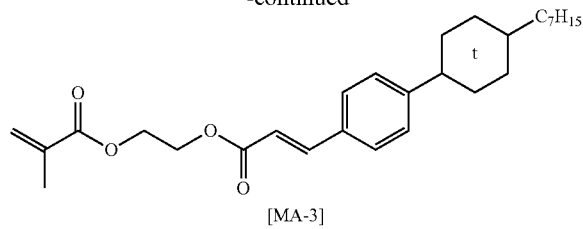

[MA-3]

1-bromo-4-(trans-4-heptyl cyclohexyl)-benzene (150.0 g, 445 mmol), tert-butyl acrylate (85.5 g, 667 mmol), palladium acetate (0.90 g, 8.9 mmol), tri(o-tolyl)phosphine (5.41 g, 18 mmol), tripropylamine (191.1 g, 1334 mmol), and DMAc (750 g) were placed in a 2-L four-necked flask, and stirred under heating at 100° C. After completion of the reaction, the reaction liquid was filtered to remove insoluble matter, the filtrate was poured to pure water (3.8 L), and neutralized with a 12 N—HCl aqueous solution. After neutralization, ethyl acetate (2.5 L) was poured, and extraction was carried out. To the extracted organic layer, anhydrous magnesium sulfate was added and dried by dehydration, and the anhydrous magnesium sulfate was filtered. The filtrate thus obtained was evaporated to remove the solvent with a rotary evaporator, the crude product was subjected to repulping washing with cold methanol (180 g), thereby obtaining 151.6 g of [MA-3-1] (white solid) (yield: 89%).

[MA-3-1] (151.6 g, 394 mmol) and formic acid (1061 g) were placed in a 2-L four-necked flask, and stirred under heating at 50° C. After completion of the reaction, the reaction liquid was poured to pure water (3.0 L), and the deposit was filtrated. The crude product thus obtained was subjected to repulping washing with ethyl acetate (500 g), thereby obtaining 121.7 g of [MA-3-2] (white solid) (yield: 94%). The result of $^1$H-NMR of the object is given below. The result confirmed that the solid thus obtained is the desired [MA-3-2].

1H NMR (400 MHz, [D$_6$]-DMSO): δ12.34 (s, 1H), 7.53-7.59 (m, 3H), 7.25-7.27 (d, 2H), 6.44-6.48 (d, 1H), 2.44-2.51 (t, 1H), 1.77-1.82 (t, 4H), 1.37-1.48 (m, 2H), 1.17-1.28 (m, 13H), 0.97-1.07 (m, 2H), 0.86-0.88 (t, 3H)

[MA-3-2] (30.0 g, 91 mmol), methacrylic acid 2-hydroxyethyl (14.3 g, 110 mmol), 1-(3-dimethylaminopropyl)-3-ethyl carbodiimide hydrochloride (EDC) (26.3 g, 137 mmol), 4-dimethylaminopyridine (1.12 g, 9.1 mmol), and THF (150 g) were placed in a 2-L four-necked flask, and stirred at room temperature. After completion of the reaction, the reaction liquid was poured to ethyl acetate (1.0 L), extraction was carried out using pure water (800 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:5 volume ratio), thereby obtaining 34.5 g of [MA-3] (white solid) (yield: 86%). The result of $^1$H-NMR of the object is given below. The result confirmed that the solid thus obtained is the desired [MA-3].

1H NMR (400 MHz, [D$_6$]-DMSO): δ7.61-7.66 (m, 3H), 7.24-7.26 (d, 2H), 6.57-6.61 (d, 1H), 6.04 (s, 1H), 5.69 (s, 1H), 4.36-4.42 (m, 4H), 2.43-2.52 (t, 1H), 1.88 (s, 3H), 1.76-1.82 (t, 4H), 1.36-1.46 (m, 2H), 1.15-1.29 (m, 13H), 0.95-1.05 (m, 2H), 0.84-0.87 (t, 3H)

Synthesis Example 4

Synthesis of [MA-4]

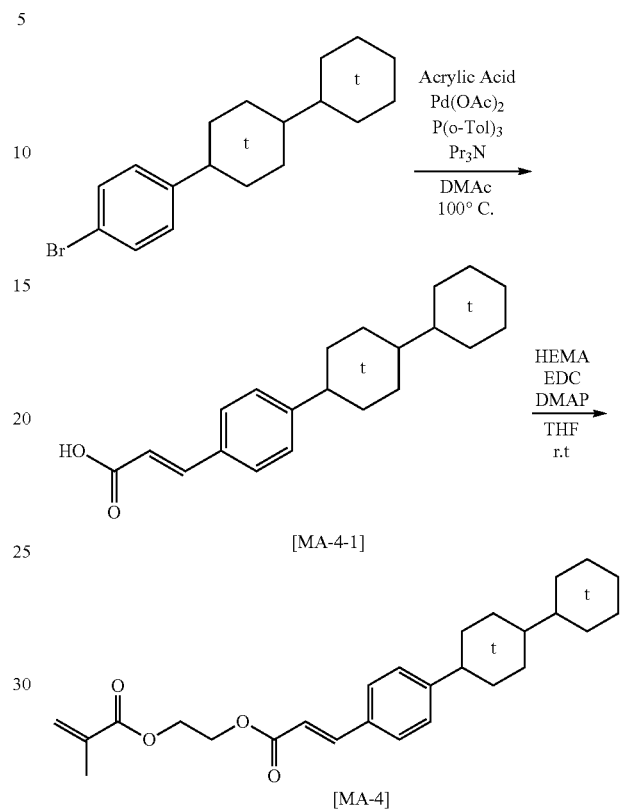

1-trans[1,1'-bicyclohexyl]-4-yl-4-bromobenzene (200.0 g, 623 mmol), acrylic acid (67.3 g, 934 mmol), palladium acetate (2.80 g, 12.4 mmol), tri(o-tolyl)phosphine (7.58 g, 25 mmol), tripropylamine (267.5 g, 1867 mmol) and DMAc (400 g) was placed in a 1-L four-necked flask, and stirred under heating at 100° C. After completion of the reaction, the reaction liquid was filtered to remove insoluble matter, the filtrate was poured to pure water (2.0 L), neutralized with 12 N—HCl aqueous solution, and the deposit was filtrated. The crude product thus obtained was subjected to repulping washing with methanol (200 g), thereby obtaining 154.1 g of [MA-4-1] (white solid) (yield: 79%). The result of $^1$H-NMR of the object is given below. The result confirmed that the solid thus obtained is the desired [MA-4-1].

1H NMR (400 MHz, [D$_6$]-DMSO): δ12.36 (s, 1H), 7.52-7.59 (m, 3H), 7.25-7.27 (d, 2H), 6.44-6.48 (d, 1H), 2.44-2.50 (t, 1H), 1.79-1.82 (m, 4H), 1.61-1.70 (m, 5H), 1.40-1.42 (d, 2H), 1.14-1.20 (m, 7H), 0.97-1.02 (m, 2H)

[MA-4-1] (100.0 g, 320 mmol), 2-hydroxyethyl methacrylate (45.8 g, 352 mmol), 1-(3-dimethylaminopropyl)-3-ethylcarbodiimide hydrochloride (EDC) (92.0 g, 480 mmol), 4-dimethylaminopyridine (3.91 g, 32 mmol), and THF (1000 g) were placed in a 2-L four-necked flask, and stirred at room temperature. After completion of the reaction, the reaction liquid was poured to ethyl acetate (0.5 L), and extraction was carried out using pure water (400 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:5 volume ratio), thereby obtaining 109.8 g of [MA-4] (white solid) (yield: 80%). The result of $^1$H-NMR of the object is given below. The result confirmed that the solid thus obtained is the desired [MA-4].

1H NMR (400 MHz, [D$_6$]-DMSO): δ7.62-7.66 (m, 3H), 7.25-7.27 (d, 2H), 6.58-6.62 (d, 1H), 6.04 (s, 1H), 5.70 (s, 1H), 4.38-4.41 (m, 4H), 2.43-2.51 (t, 1H), 1.88 (s, 3H), 1.79-1.82 (m, 4H), 1.60-1.69 (m, 5H), 1.39-1.42 (d, 2H), 1.13-1.20 (m, 7H), 0.96-1.02 (m, 2H)

Synthesis Example 5

Synthesis of [MA-5]

4-hydroxybenzoic acid tert-butyl (37.1 g, 191 mmol), 1,1,1-trifluoro-4-iodobutane (50.0 g, 210 mmol), potassium carbonate (39.7 g, 287 mmol), and DMF (300 g) were placed in a 500-mL four-necked flask, and stirred under heating at 100° C. After completion of the reaction, the reaction liquid was poured to pure water (1.5 L), and the deposit was filtrated. The crude product thus obtained was subjected to repulping washing with hexane (300 g), thereby obtaining 42.2 g of [MA-5-1] (white solid) (yield: 73%).

[MA-5-1] (42.2 g, 139 mmol) and formic acid (300 g) were placed in a 500-mL four-necked flask, and stirred under heating at 50° C. After completion of the reaction, the reaction liquid was poured to pure water (1.5 L), and the deposit was filtrated. The crude product thus obtained was

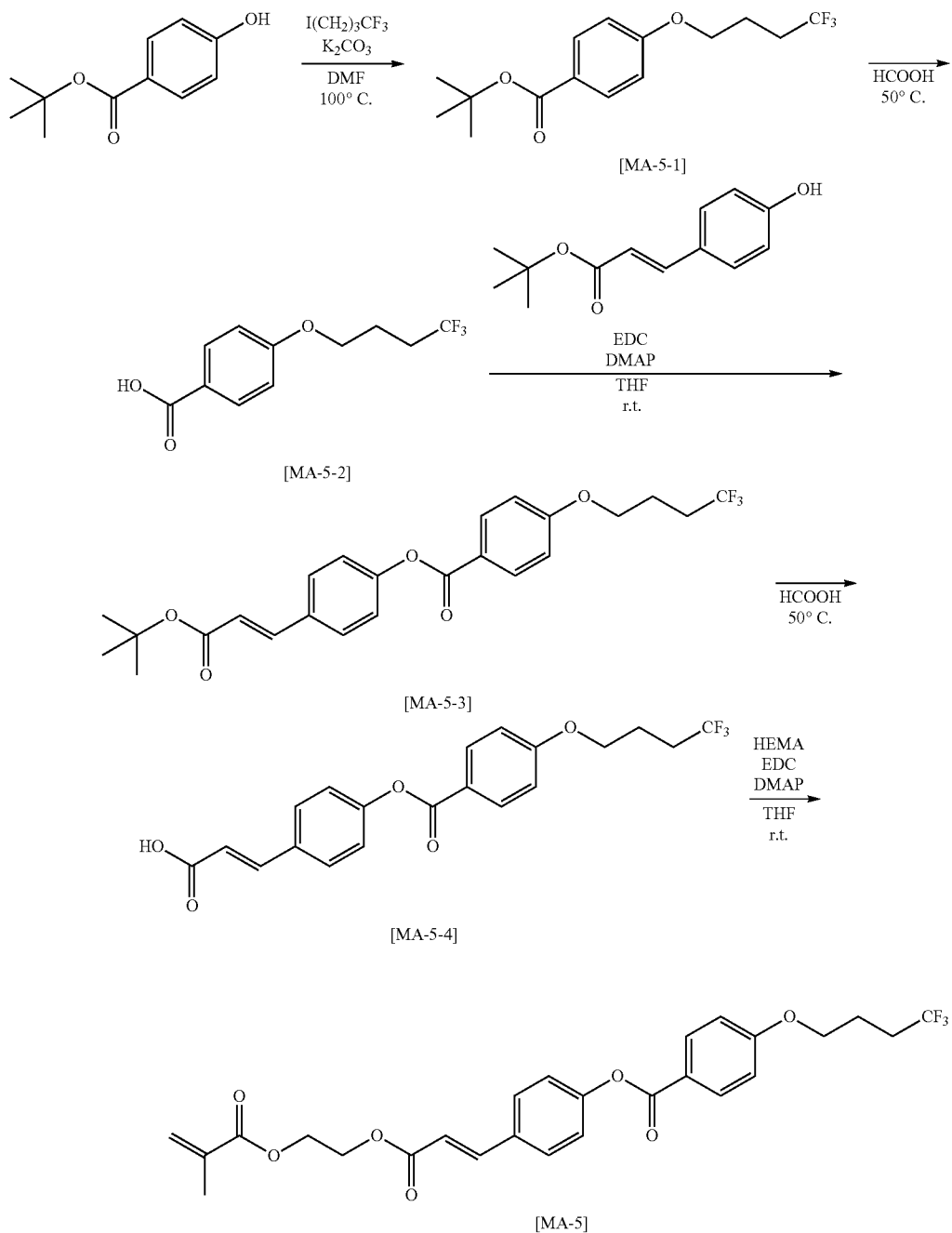

subjected to repulping washing with acetonitrile (80 g), thereby obtaining 31.9 g of [MA-5-2] (white solid) (yield: 92%).

[MA-5-2] (31.9 g, 129 mmol), trans-p-tert-butyl coumarate (42.5 g, 193 mmol), 1-(3-dimethylaminopropyl)-3-ethyl carbodiimide hydrochloride (EDC) (37.0 g, 193 mmol), 4-dimethylaminopyridine (1.59 g, 13 mmol), and THF (300 g) were placed in a 500-mL four-necked flask, and stirred at room temperature. After completion of the reaction, the reaction liquid was poured to pure water (1.5 L), and the deposit was filtrated. The crude product thus obtained was, subjected to repulping washing with methanol (180 g), thereby obtaining 43.6 g of [MA-5-3] (white solid) (yield: 75%). [MA-5-3] (43.6 g, 97 mmol) and formic acid (300 g) were placed in a 500-mL four-necked flask, and stirred under heating at 50° C. After completion of the reaction, the reaction liquid was poured to pure water (1.5 L), and the deposit was filtrated. The crude product thus obtained was subjected to repulping washing with acetonitrile (500 g), thereby obtaining 36.6 g of [MA-5-4] (white solid) (yield: 96%). The result of $^1$H-NMR of the object is given below. The result confirmed that the solid thus obtained is the desired [MA-5-4].

1H NMR (400 MHz, [D$_6$]-DMSO): δ12.46 (s, 1H), 8.08-8.10 (d, 2H), 7.78-7.81 (d, 2H), 7.61-7.65 (d, 1H), 7.31-7.34 (d, 2H), 7.13-7.16 (d, 2H), 6.53-6.57 (d, 1H), 4.16-4.19 (t, 2H), 2.40-2.47 (m, 2H), 1.95-2.02 (m, 2H)

[MA-5-4] (15.0 g, 38 mmol), 2-hydroxyethyl methacrylate (5.47 g, 42 mmol), 1-(3-dimethylaminopropyl)-3-ethyl carbodiimide hydrochloride (EDC) (10.9 g, 57 mmol), 4-dimethylaminopyridine (0.46 g, 3.8 mmol), and THF (150 g) were placed in a 500-mL four-necked flask, and stirred at room temperature. After completion of the reaction, the reaction liquid was poured to ethyl acetate (0.6 L), and extraction was carried out using pure water (500 mL). To the extracted organic layer, anhydrous magnesium sulfate was added and dried by dehydration, and the anhydrous magnesium sulfate was filtered. The filtrate thus obtained was evaporated to remove the solvent with a rotary evaporator. The residue thus obtained was isolated by silica gel column chromatography (ethyl acetate:hexane=1:1 volume ratio), thereby obtaining 16.8 g of [MA-5] (white solid) (yield: 87%). The result of 1H-NMR of the object is given below. The result confirmed that the solid thus obtained is the desired [MA-5].

1H NMR (400 MHz, [D$_6$]-DMSO): δ8.07-8.11 (d, 2H), 7.84-7.86 (d, 2H), 7.70-7.74 (d, 1H), 7.32-7.34 (d, 2H), 7.13-7.16 (d, 2H), 6.68-6.72 (d, 1H), 6.05 (s, 1H), 5.71 (s, 1H), 4.37-4.44 (m, 4H), 4.16-4.19 (t, 2H), 2.42-2.49 (m, 2H), 1.95-2.02 (m, 2H), 1.88 (s, 3H)

Synthesis Example 6

Synthesis of [MA-8]

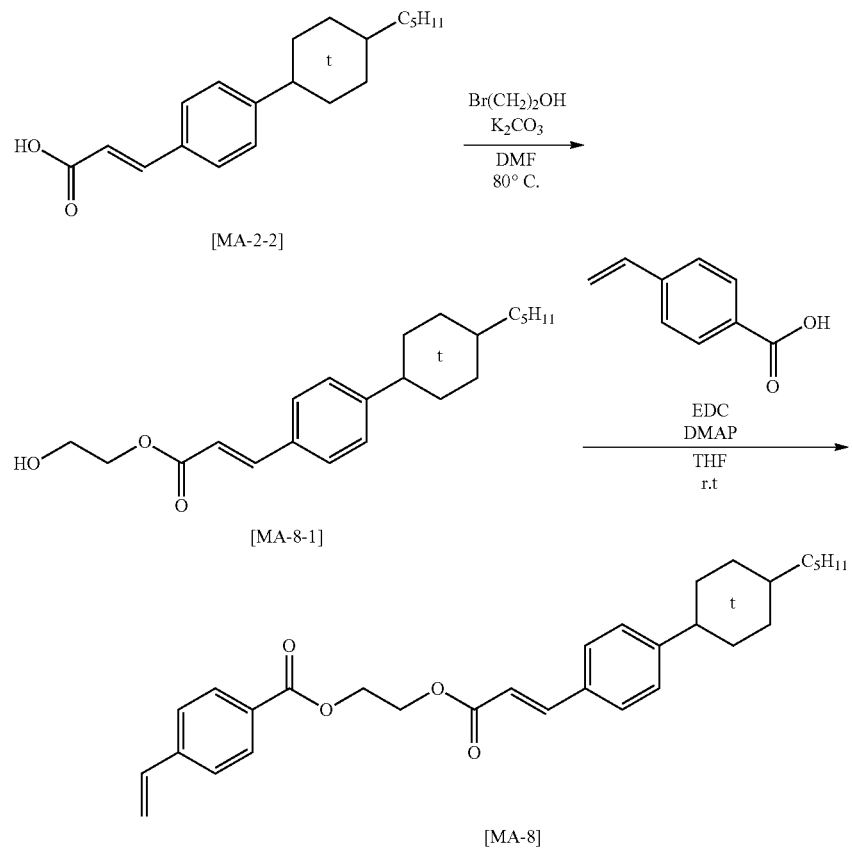

[MA-2-2] (30.0 g, 100 mmol), 2-bromoethanol (24.99 g, 200 mmol), potassium carbonate (27.64 g, 200 mmol), and DMF (150 g) were placed in a 500-mL four-necked flask, and stirred under heating at 80° C. After completion of the reaction, the reaction liquid was poured to pure water (0.6 L), neutralized with a 1N-HCl aqueous solution, and then the deposit was filtrated. The crude product thus obtained was subjected to repulping washing with methanol (60 g), thereby obtaining 27.1 g of [MA-6-1] (white solid) (yield: 79%). The result of $^1$H-NMR of the object is given below. The result confirmed that the solid thus obtained is the desired [MA-8-1].

1H NMR (400 MHz, [D$_6$]-DMSO): δ7.61-7.66 (m, 3H), 7.26-7.28 (d, 2H), 6.55-6.60 (d, 1H), 4.85-4.88 (t, 1H), 4.14-4.16 (t, 2H), 3.62-3.65 (q, 2H), 2.46-2.51 (t, 1H), 1.77-1.83 (t, 4H), 1.38-1.49 (m, 2H), 1.17-1.30 (m, 9H), 0.97-1.07 (m, 2H), 0.85-0.89 (t, 3H)

[MA-8-1] (27.1 g, 79 mmol), 4-vinylbenzoic acid (12.8 g, 87 mmol), 1-(3-dimethylaminopropyl)-3-ethyl carbodiimide hydrochloride (EDC) (22.6 g, 118 mmol), 4-dimethylaminopyridine (0.96 g, 7.9 mmol), and THF (270 g) were placed in a in a 500-mL four-necked flask, and stirred at room temperature. After completion of the reaction, the reaction liquid was poured to ethyl acetate (0.6 L), and extraction was carried out using pure water (600 mL). To the extracted organic layer, anhydrous magnesium sulfate was added and dried by dehydration, and the anhydrous magnesium sulfate was filtered. The filtrate thus obtained was evaporated with a rotary evaporator to remove the solvent. The residue thus obtained was isolated by silica gel column chromatography (ethyl acetate:hexane=1:1 volume ratio), thereby obtaining 28.6 g of [MA-8] (white solid) (yield: 76%). The result of $^1$H-NMR of the object is given below. The result confirmed that the solid thus obtained is the desired [MA-8].

1H NMR (400 MHz, [D$_6$]-DMSO): δ7.93-7.95 (d, 2H), 7.60-7.63 (m, 5H), 7.23-7.25 (d, 2H), 6.78-6.85 (q, 1H), 6.59-6.63 (d, 1H), 5.98-6.02 (d, 1H), 5.42-5.45 (d, 1H), 4.51-4.55 (m, 4H), 2.43-2.52 (t, 1H), 1.75-1.80 (t, 4H), 1.36-1.45 (m, 2H), 1.16-1.30 (m, 9H), 0.95-1.04 (t, 2H), 0.84-0.88 (t, 3H)

<Measurement of Polymer Molecular Weight>

The molecular weight of the polymer in Synthesis Examples was measured as described below using a normal temperature gel permeation chromatography (GPC) apparatus (SSC-7200) manufactured by Senshu Scientific Co., Ltd., and a column (KD-803, KD-805) manufactured by Showa Denko K.K.

Column temperature: 50° C.

Eluate: N,N'-dimethylformamide (as an additive, 30 mmol/L of lithium bromide monohydrate (LiBr.H$_2$O), 30 mmol/L of phosphoric acid-anhydrous crystal (o-phosphoric acid), and 10 mL/L of tetra hydrofuran (THF))

Flow rate: 1.0 mL/minute

Standard sample for preparing calibration curve: TSK standard polyethylene oxide manufactured by Tosoh Corporation (molecular weight: about 9000,000, 150,000, 100,000, and 30,000), and polyethylene glycol manufactured by Polymer laboratories Ltd. (molecular weight: about 12,000, 4,000, and 1,000).

Example 1

MOI-BP (3.02 g, 12.0 mmol), MA-1 (4.61 g, 12.0 mmol), and HEMA (2.08 g, 16.0 mmol) were dissolved in CHN (40.2 g), deaerated with a diaphragm pump, and then AIBN (0.33 g, 2.0 mmol) was added, and deaerated again. Thereafter, the mixture was allowed to react at 55° C. for 15 hours, thereby obtaining a polymer solution of methacrylate. To the polymer solution, CHN (75.3 g) and PGME (125.5 g) were added and diluted to 4% by mass, and stirred at room temperature for 5 hours, thereby obtaining the liquid crystal aligning agent (A). The number average molecular weight of the polymer was 45000, and the weight average molecular weight was 129000.

Example 2

MOI-BP (3.02 g, 12.0 mmol), MA-2 (4.95 g, 12.0 mmol), and HEMA (2.08 g, 16.0 mmol) were dissolved in CHN (41.5 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (78.3 g) and PGME (129.7 g) were added and diluted to 4% by mass, and stirred at room temperature for 5 hours, thereby obtaining the liquid crystal aligning agent (B). The number average molecular weight of the polymer was 39000, and the weight average molecular weight was 112000.

Example 3

MOI-BP (3.02 g, 12.0 mmol), MA-3 (5.29 g, 12.0 mmol), and HEMA (2.08 g, 16.0 mmol) were dissolved in CHN (42.9 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (80.3 g) and PGME (133.9 g) were added and diluted to 4% by mass, and stirred at room temperature for 5 hours, thereby obtaining the liquid crystal aligning agent (C). The number average molecular weight of the polymer was 44000, and the weight average molecular weight was 115000.

Example 4

MOI-BP (2.01 g, 8.0 mmol), MA-4 (8.49 g, 20.0 mmol), and HEMA (1.56 g, 12.0 mmol) were dissolved in CHN (49.6 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (92.9 g) and PGME (154.9 g) were added and diluted to 4% by mass, and stirred at room temperature for 5 hours, thereby obtaining the liquid crystal aligning agent (D). The number average molecular weight of the polymer was 31000, and the weight average molecular weight was 87000.

Example 5

MOI-BP (2.01 g, 8.0 mmol) MA-5 (10.13 g, 20.0 mmol), and HEMA (1.56 g, 12.0 mmol) were dissolved in CHN (56.1 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (105.2 g) and PGME (175.4 g) were added and diluted to 4% by mass, and stirred at room temperature for 5 hours, thereby obtaining the liquid crystal aligning agent (E). The number average molecular weight of the polymer was 36000, and the weight average molecular weight was 101000.

Example 6

MOI-BM (2.91 g, 12.0 mmol), MA-2 (4.95 g, 12.0 mmol), and HEMA (2.08 g, 16.0 mmol) were dissolved in CHN (41.0 g), deaerated with a diaphragm pump, and then AIBN (0.33 g, 2.0 mmol) was added, and deaerated again. Thereafter, the mixture was allowed to react at 55° C. for 15 hours, thereby obtaining a polymer solution of methacrylate. To the polymer solution, CHN (77.0 g), PGME (128.4 g) were added and diluted to 4% by mass, stirred at room temperature for 5 hours, thereby obtaining the liquid crystal aligning agent (F). The number average molecular weight of the polymer was 48000, and the weight average molecular weight was 132000.

Example 7

MOI-BP (3.02 g, 12.0 mmol), MA-2 (4.95 g, 12.0 mmol), and HEMA (2.08 g, 16.0 mmol) were dissolved in NMP (41.5 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, NMP (51.9 g) and BCS (69.2 g) were added and diluted to 6% by mass, and stirred at room temperature for 5 hours, thereby obtaining liquid crystal aligning agent (G). The number average molecular weight of the polymer was 18000, and the weight average molecular weight was 80000.

Example 8

MOI-BP (3.52 g, 14.0 mmol), MA-2 (4.13 g, 10.0 mmol), HEMA (1.82 g, 14.0 mmol) MA-6 (0.51 g, 2.0 mmol) were dissolved in CHN (41.2 g), deaerated with a diaphragm pump, and then AIBN (0.33 g, 2.0 mmol) was added, and deaerated again. Thereafter, the mixture was allowed to react at 55° C. for 15 hours, thereby obtaining a polymer solution of methacrylate. To the polymer solution, CHN (37.8 g) and PGME (82.4 g) were added and diluted to 6% by mass, and stirred at room temperature for 5 hours, thereby obtaining the liquid crystal aligning agent (L). The number average molecular weight of the polymer was 38000, and the weight average molecular weight was 126000.

Example 9

MOI-BP (3.52 g, 14.0 mmol) MA-2 (4.13 g, 10.0 mmol), HEMA (1.82 g, 14.0 mmol), and MA-7 (0.68 g, 2.0 mmol) were dissolved in CHN (41.9 g), deaerated with a diaphragm pump, and then AIBN (0.33 g, 2.0 mmol) was added, and deaerated again. Thereafter, the mixture was allowed to react at 55° C. for 15 hours, thereby obtaining a polymer solution of methacrylate. To the polymer solution, CHN (38.4 g) and PGME (83.8 g) were added and diluted to 6% by mass, and stirred at room temperature for 5 hours, thereby obtaining the liquid crystal aligning agent (M). The number average molecular weight of the polymer was 41000, and the weight average molecular weight was 141000.

Example 10

MOI-BP (4.02 g, 16.0 mmol), MA-8 (3.80 g, 8.0 mmol), and HEMA (2.08 g, 16.0 mmol were dissolved in CHN (40.9 g), deaerated with a diaphragm pump, and then AIBN (0.33 g, 2.0 mmol was added and deaerated again. Thereafter, the mixture was reacted at 55° C. for 15 hours, thus obtaining a polymer solution of methacrylate. To the polymer solution, CHN (37.5 g) and PGME (81.8 g) were added, diluted to 6% by mass, and stirred at room temperature for 5 hours, thereby obtaining the liquid crystal aligning agent (N). The number average molecular weight of the polymer was 27000, and the weight average molecular weight was 81000.

Example 11

HEMA (19.5 g, 150.0 mmol) was dissolved in PGME (83.2 g), deaerated with a diaphragm pump, and then AIBN (1.25 g, 7.5 mmol) was added and deaeration was carried out again. Thereafter, the mixture was allowed to react at 80° C. for 12 hours, thereby obtaining a polymer solution of methacrylate. To the polymer solution, CHN (166.0 g) and PGME (76.1 g) were added and diluted to 6% by mass, stirred at room temperature for 5 hours, thereby obtaining the polymer solution (O). The number average molecular weight of the polymer was 4800, and the weight average molecular weight was 5700.

In the next place, the liquid crystal aligning agent (B) (7.0 g) obtained in Example 2 was added to the polymer solution (O) (3.0 g) obtained above, and stirred to obtain the liquid crystal aligning agent (P).

Comparative Example 1

MOI-BP (7.04 g, 28.0 mmol) and MA-2 (4.95 g, 12.0 mmol) were dissolved in CHN (41.5 g), deaerated with a diaphragm pump, and then AIBN (0.33 g, 2.0 mmol) was added, and deaerated again. Thereafter, the mixture was allowed to react at 55° C. for 15 hours, thus obtaining a polymer solution of methacrylate. To the polymer solution, CHN (92.4 g) and PGME (153.9 g) were added and diluted to 4% by mass, and the mixture was allowed to react at room temperature for 5 hours, thereby obtaining the liquid crystal aligning agent (H). The number average molecular weight of the polymer was 41000, and the weight average molecular weight was 125000.

Comparative Example 2

HEMA (3.64 g, 28.0 mmol) and MA-2 (4.95 g, 12.0 mmol) were dissolved in CHN (35.7 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (66.9 g) and PGME (111.5 g) were added and diluted to 4% by mass, and stirred at room temperature for 5 hours, thereby obtaining the liquid crystal aligning agent (I). The number average molecular weight of the polymer was 31000, and the weight average molecular weight was 87000.

Example 12

MOI-BP (3.02 g, 12.0 mmol), MA-2 (4.95 g, 12.0 mmol), and HEMA (2.08 g, 16.0 mmol) were dissolved in CHN (41.5 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (78.3 g) and PGME (129.7 g) were added and diluted to 4% by mass, and stirred at room temperature for 5 hours, thereby obtaining the liquid crystal aligning agent (3). The number average molecular weight of the polymer was 39000, and the weight average molecular weight was 112000.

To 10.0 g of the liquid crystal aligning agent (J), TM-BIP (40 mg) (corresponding to 10% by weight of the solid content of the solution) was added as a crosslinking agent, and stirred for 3 hours, thereby obtaining the liquid crystal aligning agent (J1).

Example 13

To 10.0 g of the liquid crystal aligning agent (J) obtained in Example 12, 3AMPDA (40 mg) (corresponding to 10% by weight of the solid content of the solution) was added as a crosslinking agent, and the mixture was stirred for 3 hours to obtain the liquid crystal aligning agent (J2).

Example 14

MOI-BP (3.02 g, 12.0 mmol), MA-3 (5.29 g, 12.0 mmol), and HEMA (2.08 g, 16.0 mmol) were dissolved in CHN (42.9 g), deaerated with a diaphragm pump, and then AIBN (0.33 g, 2.0 mmol) was added and deaerated again. Thereafter, the mixture was allowed to react at 55° C. for 15 hours, thereby obtaining a polymer solution of methacrylate. To the polymer solution, CHN (80.3 g) and PGME (133.9 g) were added and diluted to 4% by mass, and stirred at room temperature for 5 hours, thereby obtaining the liquid crystal aligning agent (K). The number average molecular weight of the polymer was 44000, and the weight average molecular weight was 115000.

To 10.0 g of the liquid crystal aligning agent (K), TM-BIP (40 mg) (corresponding to 10% by weight of the solid content of the solution) was added as a crosslinking agent, and stirred for 3 hours, thereby obtaining the liquid crystal aligning agent (K1).

Example 15

To 10.0 g of the liquid crystal aligning agent (K) obtained in Example 14, 3AMPDA (40 mg) (corresponding to 10% by weight of the solid content of the solution) was added as a crosslinking agent and stirred for 3 hours, thereby obtaining the liquid crystal aligning agent (K2).

The compositions of the polymers corresponding to Examples are listed below.

TABLE 1

| | Liquid crystal aligning agent | MA-1 | MA-2 | MA-3 | MA-4 | MA-5 | MA-6 | MA-7 | MA-8 | MOI-BP | MOI-BM | HEMA | Component 2 HEMA |
|---|---|---|---|---|---|---|---|---|---|---|---|---|---|
| | | | | | | Component 1 | | | | | | | |
| Example 1 | A | 30 | | | | | | | | 30 | | 40 | |
| Example 2 | B | | 30 | | | | | | | 30 | | 40 | |
| Example 3 | C | | | 30 | | | | | | 30 | | 40 | |
| Example 4 | D | | | | 50 | | | | | 20 | | 30 | |
| Example 5 | E | | | | | 50 | | | | 20 | | 30 | |
| Example 6 | F | | 30 | | | | | | | | 30 | 40 | |
| Example 7 | G | | 30 | | | | | | | 30 | | 40 | |
| Example 8 | L | 25 | | | | | 5 | | | 35 | | 35 | |
| Example 9 | M | 25 | | | | | | 5 | | 35 | | 35 | |
| Example 10 | N | | | | | | | | 20 | 40 | | 40 | |
| Example 11 | P | | 30 | | | | | | | 30 | | 40 | 100 |
| Comparative Example 1 | H | | 30 | | | | | | | 70 | | | |
| Comparative Example 2 | I | | 30 | | | | | | | | | 70 | |

TABLE 2

| | Liquid crystal aligning agent | Crosslinking agent | MA-2 | MA-3 | MOI-BP | HEMA |
|---|---|---|---|---|---|---|
| Example 12 | J1 | TM-BIP 10% by weight | 30 | | 30 | 40 |
| Example 13 | J2 | 3AMPDA 10% by weight | 30 | | 30 | 40 |
| Example 14 | K1 | TM-BIP 10% by weight | | 30 | 30 | 40 |
| Example 15 | K2 | 3AMPDA 10% by weight | | 30 | 30 | 40 |
| Comparative Example 1 | H | | 30 | | 70 | |
| Comparative Example 2 | I | | 30 | | | 70 |

[Making of Liquid Crystal Cell]

The liquid crystal aligning agent (A) obtained in Example 1 was applied by spin coating to the ITO surface of a glass substrate with a transparent electrode made of an ITO film, and dried for 120 seconds on a hot plate at 50° C., and then baked for 20 minutes on a hot plate at 140° C., thereby forming a liquid crystal alignment film having a film thickness of 100 nm. Subsequently, the coating film surface was irradiated with 50 mJ/cm² of 313 nm linearly polarized ultraviolet light at an irradiation intensity of 4.3 mW/cm² through a polarizing plate from an angle inclined 40° toward the normal direction of the substrate, thereby obtaining a substrate with a liquid crystal alignment film. The linearly polarized light UV was prepared by passing a 313 nm bandpass filter through ultraviolet light of a high pressure mercury lamp, and then passing a 313 nm polarizing plate.

Two pieces of the above-described substrate were provided, 4 μm bead spacers were spread on the liquid crystal alignment film of one substrate, and then a sealing agent (XN-1500T manufactured by Kyoritsu Chemical Co., Ltd.) was applied. Subsequently, the other substrate was bonded thereto in such a manner that the liquid crystal alignment film surfaces are faced to each other and the alignment direction was 180°, and then the sealing agent was heat-cured at 120° C. for 90 minutes, thereby making empty cells. Into the empty cells, negative liquid crystal (MLC-3022, manufactured by Merck Ltd.) was injected by a reduced pressure injection method, thereby making liquid crystal cells.

[Evaluation of Pretilt Angle]

The pretilt angles of the liquid crystal cells was measured by the Mueller Matrix method using "AxoScan" of AxoMetrix. The result is summarized in Table 1.

[Evaluation of Liquid Crystal Alignment]

After making liquid crystal cells, they were subjected to isotropic phase treatment at 120° C. for 1 hour, and then the cell was observed with a polarization microscope; alignment was regarded as good when there was no alignment faulty such as light void and generation of domains, and when uniform driving of liquid crystal was achieved upon application of a voltage to the liquid crystal cells.

Examples 2 to Example 15 and Comparative Examples 1 to 2 were subjected to the same operations as those in Example 1, and evaluated for the pretilt angles and liquid crystal alignment of the liquid crystal cells. Additionally, for some Examples, the baking temperature and the polarized UV exposure dose were changed and evaluated.

The results are given in Tables 3 and 4.

TABLE 3

| | Liquid crystal aligning agent | Baking conditions (° C./minute) | Exposure dose (mJ/cm²) | Pretilt angles (°) | Liquid crystal alignment |
|---|---|---|---|---|---|
| Example 1 | A | 140/20 | 50 | 87.8 | Good |
| Example 2 | B | 120/20 | 50 | 88.6 | Good |
| | | 140/20 | 5 | 89.4 | Good |
| | | | 20 | 88.8 | Good |
| | | | 50 | 88.3 | Good |
| | | | 100 | 88.4 | Good |
| | | 200/20 | 50 | 88.7 | Good |
| Example 3 | C | 140/20 | 50 | 88.5 | Good |
| Example 4 | D | | 50 | 87.8 | Good |
| Example 5 | E | | 50 | 87.3 | Good |
| Example 6 | F | | 20 | 89.2 | Good |
| | | | 50 | 88.7 | Good |
| | | | 100 | 89.1 | Good |

TABLE 3-continued

| | Liquid crystal aligning agent | Baking conditions (° C./minute) | Exposure dose (mJ/cm²) | Pretilt angles (°) | Liquid crystal alignment |
|---|---|---|---|---|---|
| Example 7 | G | | 50 | 88.4 | Good |
| Example 8 | L | 120/20 | 50 | 88.6 | Good |
| Example 9 | M | 120/20 | 50 | 89.3 | Good |
| Example 10 | N | 120/20 | 50 | 89.4 | Good |
| Example 11 | P | 120/20 | 50 | 88.8 | Good |
| Example 12 | J1 | 140/20 | 50 | 88.9 | Good |
| | | 200/20 | 50 | 88.8 | Good |
| Example 13 | J2 | 140/20 | 50 | 88.8 | Good |
| | | 200/20 | 50 | 88.9 | Good |
| Example 14 | K1 | 140/20 | 50 | 89.1 | Good |
| | | 200/20 | 50 | 89 | Good |
| Example 15 | K2 | 140/20 | 50 | 88.9 | Good |
| | | 200/20 | 50 | 89.8 | Good |
| Comparative Example 1 | H | 140/20 | 50 | 89.8 | Bad |
| Comparative Example 2 | I | | 50 | 90 | Bad |

As indicated by Examples, good pretilt angles were obtained by the use of the specific polymer of the present invention even when baked at low temperatures of 140° C. or lower.

On the other hand, as indicated by Comparative Examples, good pretilt angles and liquid crystal alignment were not obtained only by the combination of a side chain having a photoreactive group and a side chain having at least one functional group selected from an amino group and a hydroxyl group in each molecule, and the combination of a side chain having a photoreactive group and a side chain having an isocyanate group and/or a blocked isocyanate group.

The reason for this is considered that anisotropy imparted to the side chain by photoreaction was disappeared by curing of the sealing agent and heating during isotropic phase treatment.

INDUSTRIAL APPLICABILITY

The liquid crystal aligning agent of the present invention allows relatively free formation of a liquid crystal alignment film which has been improved in various properties, and thus can be widely used in liquid crystal display elements fulfilling various demands.

What is claimed is:

1. A liquid crystal aligning agent, comprising a polymer having:
   (a) a side chain having an isocyanate group and/or a blocked isocyanate group;
   (b) a side chain having at least one functional group selected from an amino group and a hydroxyl group within each molecule; and
   (c) a side chain having a photoreactive group having photoalignment,
   wherein the side chain (a) having an isocyanate group and/or a blocked isocyanate group is derived from a monomer represented by formula (1m):

$$M_a\text{-}M_b\text{-}[\text{-}S_a\text{---}I_a]_p \tag{1m}$$

wherein Ma represents a first polymerizable group,
   Mb represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group, each group is optionally unsubstituted or substituted with a fluorine atom, a chlorine atom, a cyano group, a methyl group, or a methoxy group at one or more hydrogen atoms, Ia represents an isocyanate group or a blocked isocyanate group, p represents an integer of 1 to 3, and Sa is represented by formula (2):

    (2)

wherein a bonding left of $W_1$ represents a bonding to Mb, a bonding right of $W_3$ represents a bonding to Ia, $W_1$, $W_2$, and $W_3$ each independently represent a single bond, a divalent heterocycle, —$(CH_2)_n$—, wherein n represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C—, one or more non-adjacent $CH_2$ groups in these substituents are optionally independently substituted with —O—, —CO—, —CO—O—, —O—CO—, —$Si(CH_3)_2$—O—Si $(CH_3)_2$—, —NR—, —NR—CO—, —CO—NR—, —NR—CO—O—, —OCO—NR—, —NR—CO—NR—, —CH=CH—, —C≡C— or —O—CO—O—, wherein, R represents independently a hydrogen or a linear or branched alkyl group having a carbon number of 1 to 5, and $A_1$ and $A_2$ each independently represents a divalent aromatic group, a divalent alicyclic group, a divalent heterocyclic group, or a divalent condensed cyclic group, each group is optionally unsubstituted or substituted with a fluorine atom, a chlorine atom, a cyano group, a methyl group, or a methoxy group at one or more hydrogen atoms.

2. The liquid crystal aligning agent according to claim 1, wherein Ia in the formula (1) is selected from the group consisting of structures Ia-1 to Ia-8:

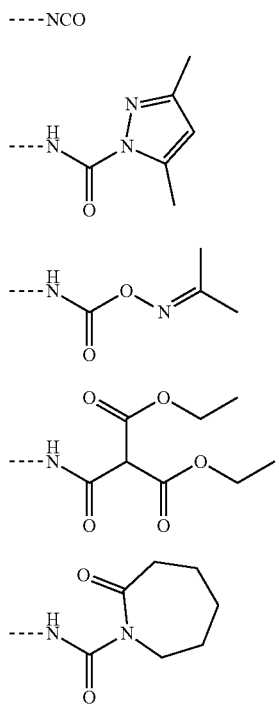

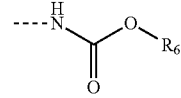

Ia-6

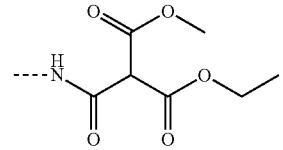

Ia-7

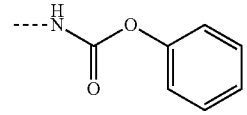

Ia-8 wherein a broken line represents a bonding to Sa in the formula (1), and $R_6$ represents a linear or branched alkyl group having a carbon number of 1 to 10 wherein one or more non-adjacent $CH_2$ groups are optionally independently substituted with an oxygen atom.

3. The liquid crystal aligning agent according to a claim 1, wherein the side chain (b) having a photoreactive group having photoalignment is represented by formula (3):

    (3)

wherein

Ib is a monovalent organic group photoreactive group having photoalignment,

Sb represents a spacer unit, and a bonding pointer left of Sb means a bonding to a backbone of the polymer optionally via a spacer.

4. The liquid crystal aligning agent according to claim 1, wherein the side chain (b) having a photoreactive group having photoalignment is derived from a monomer represented by formula (3m):

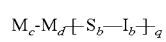    (3m)

wherein Mc represents a second polymerizable group, $M_d$ represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group, each group is optionally unsubstituted or substituted with a fluorine atom, a chlorine atom, a cyano group, a methyl group, or a methoxy group at one or more hydrogen atoms, Sb represents a spacer unit, Ib is a monovalent organic group having a photoreactive group having photoalignment, and q is an integer of 1 to 3.

5. The liquid crystal aligning agent according to claim 4, wherein Sb in the formula (3m) is represented by formula (2):

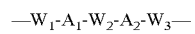    (2)

wherein a bonding left of $W_1$ represents a bonding to Md, a bonding right of $W_3$ represents a bonding to Ib, W₁, W₂, and W₃ each independently represents a single bond, a divalent heterocycle, —(CH₂)ₙ—, wherein n represents 1 to 20, —OCH₂—, —CH₂O—, —COO—, —OCO—, —CH=CH—, —CF=CF—, —CF₂O—, —OCF₂—, —CF₂CF₂—, or —C≡C—, one or more non-adjacent CH₂ groups in these substituents are optionally independently substituted with —O—, —CO—, —CO—O—, —O—CO—, —Si(CH₃)₂—O—Si(CH₃)₂—, —NR—, —NR—CO—, —CO—NR—, —NR—CO—O—, —OCO—NR—, —NR—CO—NR—, —CH=CH— or —C≡C—, or —O—CO—O—, wherein R independently represents a hydrogen or a linear or branched alkyl group having a carbon number of 1 to 5, and A₁ and A₂ each independently represent a divalent aromatic group, a divalent alicyclic group, a divalent heterocyclic group, or a divalent condensed cyclic group, each group is optionally unsubstituted or substituted with a fluorine atom, a chlorine atom, a cyano group, a methyl group, or a methoxy group at one or more hydrogen atoms.

6. The liquid crystal aligning agent according to claim 3, wherein the photoreactive group of the formula Ib has a group represented by formulae (III)-1 to (III)-4:

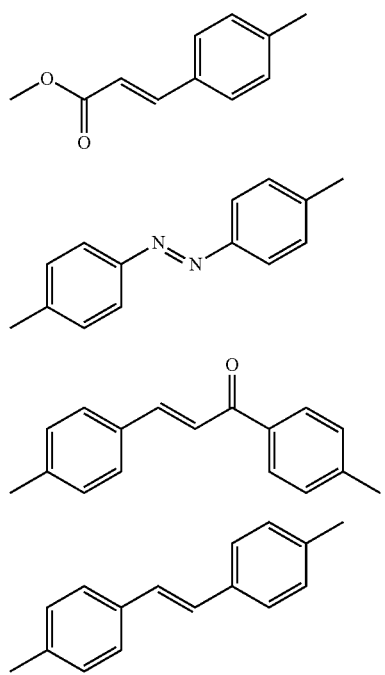

(III)-1

(III)-2

(III)-3

(III)-4

7. The liquid crystal aligning agent according to claim 4, wherein the monomer represented by the formula (3m) is a monomer represented by formula (3m)-1:

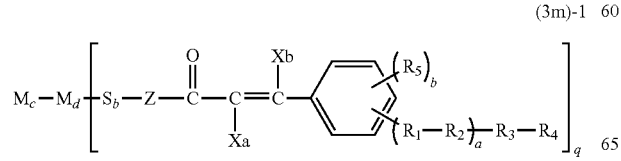

(3m)-1 wherein
Sb is an alkylene group having a carbon number of 1 to 10 or a divalent aromatic group,
Z is an oxygen atom or a sulfur atom,
Xa and Xb are each independently a hydrogen atom, a fluorine atom, a chlorine atom, a cyano group, or an alkyl group having a carbon number of 1 to 3,
R₁ is a single bond, an oxygen atom, —COO—, or —OCO—,
R₂ is a divalent aromatic group, a divalent alicyclic group, a divalent heterocyclic group, or a divalent condensed cyclic group,
R₃ is a single bond, an oxygen atom, —COO—, or —OCO—,
R₄ is an alkyl group having a carbon number of 1 to 20 or a monovalent organic group including an alicyclic group having an carbon number of 3 to 20,
R₅ represents a fluorine atom or a cyano group,
a is an integer of 0 to 3, and
b is an integer of 0 to 4.

8. The liquid crystal aligning agent according to claim 1, wherein the side chain (c) having at least one functional group selected from an amino group and a hydroxyl group within each molecule is represented by formula (4):

$$—S_c—I_c \quad (4)$$

wherein
Ic is a monovalent organic group having at least one functional group selected from an amino group and a hydroxyl group within each molecule,
Sc represents a spacer unit, and
a bonding pointer left of Sc represents a bonding to a backbone of the polymer optionally via a spacer.

9. The liquid crystal aligning agent according to claim 1, wherein the side chain (c) having at least one functional group selected from an amino group and a hydroxyl group within each molecule is derived from the monomer represented by formula (4m):

$$M_e\text{-}M_f\text{-}[S_c—I_c]_r \quad (4m)$$

wherein
Me represents a third polymerizable group,
Mf represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group, each group is optionally unsubstituted or substituted with a fluorine atom, a chlorine atom, a cyano group, a methyl group, or a methoxy group at one or more hydrogen atoms,
Sc represents a spacer unit,
Ic represents a monovalent organic group having at least one functional group selected from an amino group and a hydroxyl group within each molecule, and
r is an integer of 1 to 3.

10. The liquid crystal aligning agent according to claim 9, wherein Sc in the formula (4m) is represented by formula (2):

—W₁-A₁-W₂-A₂-W₃— (2)

wherein a bonding left of $W_1$ represents a bonding to Mf, a bonding right of $W_3$ represents a bonding to Ic, $W_1$, $W_2$, and $W_3$ each independently represent a single bond, a divalent heterocycle, —$(CH_2)_n$—, wherein n represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C—, one or more non-adjacent $CH_2$ groups in these substituents are optionally independently substituted with —O—, —CO—, —CO—O—, —O—CO—, —$Si(CH_3)_2$—O—$Si(CH_3)_2$—, —NR—, —NR—CO—, —CO—NR—, —NR—CO—O—, —OCO—NR—, —NR—CO—NR—, —CH=CH—, —C≡C—, or —O—CO—O—, wherein, R independently represents a hydrogen or a linear or branched alkyl group having a carbon number of 1 to 5, and $A_1$ and $A_2$ each independently represent a divalent aromatic group, a divalent alicyclic group, a divalent heterocyclic group, or a divalent condensed cyclic group, each group is optionally unsubstituted or substituted with a fluorine atom, a chlorine atom, a cyano group, a methyl group, or a methoxy group at one or more hydrogen atoms.

11. The liquid crystal aligning agent according to claim 1, wherein the first polymerizable group represents at least one group selected from the group consisting of a radical polymerizable group of (meth)acrylate, fumarate, maleate, α-methylene-γ-butyrolactone, styrene, vinyl, maleimide, norbornene, (meth)acrylamide, and derivatives thereof, and siloxane.

12. The liquid crystal aligning agent according to claim 1, further comprising a compound having two or more of one or more functional groups selected from the group consisting of an amino group and a hydroxyl group in each molecule as a crosslinking compound.

13. The liquid crystal aligning agent according to claim 12, wherein the crosslinking compound is represented by formula (5):

 (5)

wherein T represents an amino group or a hydroxyl group, Y represents an organic group with a valence of m, and m is an integer of 2 or more.

14. A liquid crystal alignment film obtained from the liquid crystal aligning agent according to claim 1.

15. A liquid crystal display element having the liquid crystal alignment film according to claim 14.

16. The liquid crystal aligning agent according to claim 4, wherein the second polymerizable group represents at least one group selected from the group consisting of a radical polymerizable group of (meth)acrylate, fumarate, maleate, α-methylene-γ-butyrolactone, styrene, vinyl, maleimide, norbornene, (meth)acrylamide, and derivatives thereof, and siloxane.

17. The liquid crystal aligning agent according to claim 9, wherein the third polymerizable group represents at least one group selected from the group consisting of a radical polymerizable group of (meth)acrylate, fumarate, maleate, α-methylene-γ-butyrolactone, styrene, vinyl, maleimide, norbornene, (meth)acrylamide, and derivatives thereof, and siloxane.

18. A liquid crystal aligning agent, comprising a polymer having:

(a) a side chain having an isocyanate group and/or a blocked isocyanate group;

(b) a side chain having at least one functional group selected from an amino group and a hydroxyl group within each molecule; and (c) a side chain having a photoreactive group having photoalignment, wherein the side chain (b) having a photoreactive group having photoalignment is derived from a monomer represented by formula (3m):

 (3m)

wherein Mc represents a second polymerizable group, $M_d$ represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group, each group is optionally unsubstituted or substituted with a fluorine atom, a chlorine atom, a cyano group, a methyl group, or a methoxy group at one or more hydrogen atoms, Sb represents a spacer unit, Ib is a monovalent organic group having a photoreactive group having photoalignment, q is an integer of 1 to 3, and Sb is represented by formula (2):

 (2)

wherein a bonding left of $W_1$ represents a bonding to Md, a bonding right of $W_3$ represents a bonding to Ib, $W_1$, $W_2$, and $W_3$ each independently represents a single bond, a divalent heterocycle, —$(CH_2)_n$—, wherein n represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C—, one or more non-adjacent $CH_2$ groups in these substituents are optionally independently substituted with —O—, —CO—, —CO—O—, —O—CO—, —$Si(CH_3)_2$—O—$Si(CH_3)_2$—, —NR—, —NR—CO—, —CO—NR—, —NR—CO—O—, —OCO—NR—, —NR—CO—NR—, —CH=CH—, —C≡C—, or —O—CO—O—, wherein R independently represents a hydrogen or a linear or branched alkyl group having a carbon number of 1 to 5, and $A_1$ and $A_2$ each independently represent a divalent aromatic group, a divalent alicyclic group, a divalent heterocyclic group, or a divalent condensed cyclic group, each group is optionally unsubstituted or substituted with a fluorine atom, a chlorine atom, a cyano group, a methyl group, or a methoxy group at one or more hydrogen atoms.

19. A liquid crystal aligning agent, comprising a polymer having:

(a) a side chain having an isocyanate group and/or a blocked isocyanate group;

(b) a side chain having at least one functional group selected from an amino group and a hydroxyl group within each molecule; and (c) a side chain having a photoreactive group having photoalignment, wherein the side chain (c) having at least one functional group selected from an amino group and a hydroxyl group within each molecule is derived from the monomer represented by formula (4m):

$$M_e\text{-}M_f\text{-}[S_c\text{—}I_c]_r \quad (4m)$$

wherein

Me represents a third polymerizable group,

Mf represents a single bond, a divalent heterocycle, a trivalent heterocycle, a tetravalent heterocycle, a substituted or unsubstituted linear or branched alkyl group having a carbon number of 1 to 10, a divalent aromatic group, a trivalent aromatic group, a tetravalent aromatic ring, a divalent alicyclic group, a trivalent alicyclic group, a tetravalent alicyclic group, a divalent condensed cyclic group, a trivalent condensed cyclic group, or a tetravalent condensed cyclic group, each group is optionally unsubstituted or substituted with a fluorine atom, a chlorine atom, a cyano group, a methyl group, or a methoxy group at one or more hydrogen atoms, Ic represents a monovalent organic group having at least one functional group selected from an amino group and a hydroxyl group within each molecule, r is an integer of 1 to 3, and Sc is represented by formula (2):

$$\text{—}W_1\text{-}A_1\text{-}W_2\text{-}A_2\text{-}W_3\text{—} \quad (2)$$

wherein a bonding left of $W_1$ represents a bonding to Mf, a bonding right of $W_3$ represents a bonding to Ic, $W_1$, $W_2$, and $W_3$ each independently represent a single bond, a divalent heterocycle, —$(CH_2)_n$—, wherein n represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C—, one or more non-adjacent $CH_2$ groups in these substituents are optionally independently substituted with —O—, —CO—, —CO—O—, —O—CO—, —$Si(CH_3)_2$—O—$Si(CH_3)_2$—, —NR—, —NR—CO—, —CO—NR—, —NR—CO—O—, —OCO—NR—, —NR—CO—NR—, —CH=CH—, —C≡C—, or —O—CO—O—, wherein, R independently represents a hydrogen or a linear or branched alkyl group having a carbon number of 1 to 5, and $A_1$ and $A_2$ each independently represent a divalent aromatic group, a divalent alicyclic group, a divalent heterocyclic group, or a divalent condensed cyclic group, each group is optionally unsubstituted or substituted with a fluorine atom, a chlorine atom, a cyano group, a methyl group, or a methoxy group at one or more hydrogen atoms.

* * * * *